(12) United States Patent
Enjalbert

(10) Patent No.: US 10,545,168 B2
(45) Date of Patent: Jan. 28, 2020

(54) MICROELECTROMECHANICAL SYSTEMS DEVICE AND METHOD

(71) Applicant: NXP USA, Inc., Austin, TX (US)

(72) Inventor: Jerome Romain Enjalbert, Tournefeuille (FR)

(73) Assignee: NXP USA, Inc., Austin, TX (US)

(*) Notice: Subject to any disclaimer, the term of this patent is extended or adjusted under 35 U.S.C. 154(b) by 181 days.

(21) Appl. No.: 15/800,222

(22) Filed: Nov. 1, 2017

(65) Prior Publication Data

US 2018/0143218 A1 May 24, 2018

(30) Foreign Application Priority Data

Nov. 22, 2016 (EP) .................................. 16306535

(51) Int. Cl.
  *G01P 15/125* (2006.01)
  *G01P 15/08* (2006.01)
  *G01P 21/00* (2006.01)

(52) U.S. Cl.
  CPC ............ *G01P 15/125* (2013.01); *G01P 21/00* (2013.01); *G01P 2015/0874* (2013.01)

(58) Field of Classification Search
  CPC ......... G01P 15/125; G01P 15/08; G01P 15/18
  See application file for complete search history.

(56) References Cited

U.S. PATENT DOCUMENTS

| 7,724,000 | B2 | 5/2010 | Grosjean et al. |
| 2009/0320557 | A1* | 12/2009 | Sammoura .......... B81C 99/0045 73/9 |
| 2010/0251800 | A1 | 10/2010 | Mueck |
| 2013/0265070 | A1* | 10/2013 | Kleks ................. G01R 27/2605 324/750.3 |
| 2014/0217929 | A1 | 8/2014 | Lin et al. |

(Continued)

OTHER PUBLICATIONS

De Wolf, I. et al; "Failure mechanisms and reliability issues of RF-MEMS switches"; IMES, Leuven, BE; MEMSWAVE 2005; Retreived from the internet Oct. 20, 2017 file:///C:/Users/usb01158/Downloads/4_ESA_RT2006_De_Wolf.pdf; 30 pages (2005).

(Continued)

*Primary Examiner* — Helen C Kwok
(74) *Attorney, Agent, or Firm* — Charlene R. Jacobsen

(57) ABSTRACT

A micro-electro-mechanical system (MEMS) device and a method of testing a MEMS device. The device includes a MEMS sensor having first and second mobile elements, first and second electrodes arranged to deflect the mobile elements by the application of test voltages, and a differential detector circuit. The device also includes an input multiplexer circuit configured selectively to connect each electrode to a test voltage source to apply a plurality of test voltages to deflect the mobile elements during a test mode. The test voltages comprise a set of monotonically increasing test voltages and a set of monotonically decreasing voltages for performing a C(V) sweep to test for stiction. The device further includes an output multiplexer circuit configured selectively to connect the first mobile element and/or the second mobile element to a single one of the inputs of the detector circuit to detect the deflection of the mobile element.

15 Claims, 14 Drawing Sheets

(56) References Cited

U.S. PATENT DOCUMENTS

| | | | | |
|---|---|---|---|---|
| 2014/0345380 A1* | 11/2014 | Jia | ........................ | B81B 3/0016 |
| | | | | 73/514.32 |
| 2015/0002982 A1* | 1/2015 | Cazzaniga | .......... | B81C 1/00968 |
| | | | | 361/233 |
| 2015/0096377 A1* | 4/2015 | Membretti | ............ | G01P 15/125 |
| | | | | 73/514.32 |
| 2017/0003315 A1* | 1/2017 | Enjalbert | ................ | G01P 21/00 |
| 2018/0113147 A1* | 4/2018 | Enjalbert | .............. | G01P 15/125 |

OTHER PUBLICATIONS

Yu, Tao et al; "In Situ Characterization of Induced Stiction in a MEMS"; IEEE Journal of Microelectromechanical Systems, vol. 16, No. 2; pp. 355-364 (Apr. 2007).

* cited by examiner

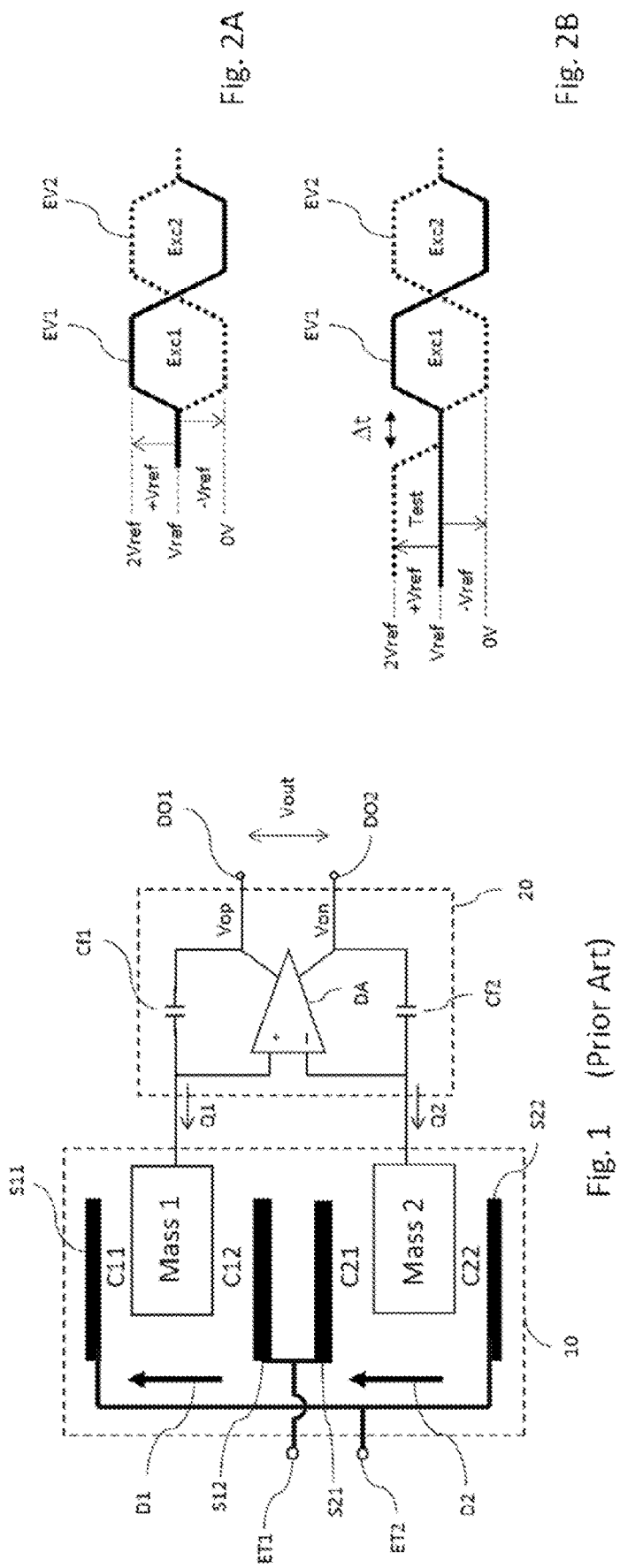

MICROELECTROMECHANICAL SYSTEMS DEVICE AND METHOD

CROSS-REFERENCE TO RELATED APPLICATIONS

This application claims the priority under 35 U.S.C. § 119 of European patent application no. 16306535.2, filed Nov. 22, 2016, the contents of which are incorporated by reference herein.

The present specification relates to a microelectromechanical systems (MEMS) device and to a method of testing a microelectromechanical systems (MEMS) device.

MEMS devices typically include components between 1 to 100 micrometers in size (i.e. 0.001 to 0.1 mm), and generally range in size from 20 micrometers (0.02 mm) to a millimeter. A MEMS device may consist of several components that interact with the surroundings such as microsensors. Examples of such microsensors are acceleration sensors which typically include a mass which is movable, relative to a body of the device, under the influence of an acceleration. MEMS acceleration sensors typically include capacitors constituted by cooperating pairs of surfaces, one surface of each pair being located on a movable body and the other surface of each pair being located on the body of the sensor. The movement due to the acceleration may, depending on its direction, result in a change in the capacitance values of the capacitors. This change in capacitance values can, in some types of acceleration sensors, be determined by applying excitation voltages to the capacitors and measuring any currents flowing into the movable mass.

MEMS sensors are increasingly miniaturised. To save space, the terminals of the sensors may have a dual use, serving both as excitation terminals and as test terminals. Excitation terminals serve to supply excitation voltages to the sensor which allow a desired parameter to be sensed or measured. Test terminals serve to supply test voltages to test the sensor. In some sensors, such as differential acceleration sensors in which pairs of movable bodies are capable of moving in the same direction and in opposite directions, a straightforward dual use of the terminals is not possible due to the symmetry of the sensor arrangement, which typically produces no output signal when the movable bodies are moving in opposite directions during a test.

In capacitive MEMS technology used for motion sensors, C(V) sweeps are a key characterization tool to ensure MEMS parameters are within specification and to detect stiction. Stiction refers to the sticking of mobile elements of a MEMS device to fixed plates of the device. Sticking is a major problem in the MEMS industry.

Traditional motion sensor packages use wire bonding between a MEMS die and an Application Specific Integrated Circuit (ASIC) die. The MEMS die typically includes a first semiconductor substrate, which includes the MEMS components, and a second substrate, referred to as a cap, which is bonded to the first substrate. The cap protects the MEMS components from the surrounding environment (e.g. from dust particles).

Using MEMS pads, which remain accessible after cap is placed above MEMS components, it is possible to characterize MEMS mobile structures and to detect stiction occurrences. The MEMS die can thus be tested using ASIC Test Equipment (ATE).

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a micro-electro-mechanical system (MEMS) device comprising:
  a MEMS sensor comprising:
    a first mobile element;
    a second mobile element;
    a first electrode arranged to deflect the first mobile element and the second mobile element by application of a voltage across said first electrode and the first and second mobile elements;
    a second electrode arranged to deflect the first mobile element and the second mobile element by application of a voltage across said second electrode and the first and second mobile elements;
    a differential detector circuit comprising a first input and a second input;
  an input multiplexer circuit comprising one or more switches configured selectively to connect each electrode to a test voltage source to apply a plurality of test voltages across each electrode and said mobile elements to deflect the mobile elements during a test mode of the device, wherein said test voltages comprise a first set of monotonically increasing test voltages and a second set of monotonically decreasing voltages for performing a C(V) sweep to test for stiction of the mobile elements; and
  an output multiplexer circuit comprising one or more switches configured selectively to connect the first mobile element and/or the second mobile element to a single one of said first and second inputs of the detector circuit during said test mode to detect the deflection of the mobile element caused by the application of said test voltages.

According to another aspect of the present disclosure, there is provided a method of testing a micro-electro-mechanical system (MEMS) device, the device comprising:
  a MEMS sensor comprising:
    a first mobile element;
    a second mobile element;
    a first electrode arranged to deflect the first mobile element and the second mobile element by application of a voltage across said first electrode and the first and second mobile elements;
    a second electrode arranged to deflect the first mobile element and the second mobile element by application of a voltage across said second electrode and the first and second mobile elements;
    a differential detector circuit comprising a first input and a second input;
  an input multiplexer circuit; and
  an output multiplexer circuit,
the method comprising performing a C(V) sweep to test for stiction of the mobile elements by:
  operating one or more switches of the input multiplexer circuit during a test mode of the device selectively to connect each electrode to a test voltage source to apply a plurality of test voltages across each electrode and said mobile elements, wherein said test voltages comprise a first set of monotonically increasing test voltages and a second set of monotonically decreasing voltages; and
  operating one or more switches of the output multiplexer circuit selectively to connect the first mobile element and/or the second mobile element to a single one of said first and second inputs of the detector circuit during said test mode to detect the deflection of the mobile element caused by the application of said test voltages.

Embodiments of the present disclosure may allow stiction testing to be performed in a MEMS device, such as a differential acceleration sensor, in which the same electrodes may be used as both the excitation terminals and the test terminals of the device. The input multiplexer may operate during a test mode of the device for applying test voltages suitable for performing a C(V) sweep. The test voltages may cause deflection of the mobile elements, thereby allowing stiction to be detected and evaluated. Moreover, by connecting the first mobile element and/or the second mobile element to a single one of the first and second inputs of the detector circuit during the test mode, a non-zero output signal may be produced by the detector circuit, even in devices in which the mobile elements may be symmetrically arranged, and in which the mobile elements may deflect in opposite directions under test voltages.

The test voltages would not normally be applied to the electrodes of the MEMS sensor simultaneously, as this may generally lead to zero net displacement of the mobile elements. Instead, during the test mode, the test voltages may be applied to the electrodes one at a time.

The input multiplexer circuit may further be configured to disconnect each electrode from the test voltage source and to connect each electrode to a second voltage source during the test mode, for performing a C(V) measurement at each of said plurality of test voltages.

While the test voltage source may allow suitable test voltages to be applied for deflecting the mobile elements of the MEMS device, the second voltage source may allow suitable voltages to be applied for detecting the amount of deflection caused by the test voltages. Note that the voltages applied by the test voltage source to cause deflection of the mobile elements may be significantly higher than the voltages required to detect the deflection caused by the test voltages. Accordingly, the test voltage source may be configured to supply voltages that are higher than the second voltage source.

The C(V) measurements may be interleaved with the application of the test voltages. It is envisaged that the disconnection of the electrodes from the test voltage source and the connection of the electrodes to the second voltage source during the test mode (as well as any detection process using voltages applied to the electrodes by the second voltage source) may take place on a timescale that is significantly shorter than the time required for the deflection of the mobile elements to decay (reduce), whereby accurate detection of the amount of deflection caused by the applied test voltage may be achieved.

The input multiplexer circuit may be further configured to disconnect the electrodes from the test voltage source and to connect the electrodes to said second voltage source during normal operation of the device. The second voltage source may thus have two functions: (i) supplying appropriate voltages for detection of any deflection caused by the applied test voltages during the test mode of the device, and (ii) sensing of a desired parameter (which may, for example, again be the amount of deflection of the mobile mass(es)) during normal operation of the MEMS device.

The device may further include a controller configured to:
open one or more first switches of the input multiplexer for disconnecting each electrode from the test voltage source; and
close one or more second switches of the input multiplexer for connecting each electrode to the second voltage source for applying excitation signals for measuring the deflection of the mobile element caused by the application of said test voltages.

The controller may be operable to ensure that the first switch(es) and the second switch(es) of the input multiplexer are not closed at the same time, so as to avoid the electrodes receiving voltages from the test voltage source and the second voltage source at the same time. Additionally, as will be described herein, it is desirable that the measurement of the deflection of the mobile elements be performed quickly, so as to avoid significant decay of the deflection of the mobile elements on disconnection of the electrodes from the test voltage source (i.e. so as to accurately measure the deflection). The controller may thus be operable to:
synchronise the opening of the first switch(es) and the closing of the second switch(es) such that the second switch(es) are not closed until the first switch(es) are opened, but also so that the second switch(es) are closed without significant delay (e.g. within 100 ns) after the first switch(es) are opened;
operate the second switch(es) so that they remain closed only for a short period (e.g. 10-20 μs) to allow measurement of the deflection of the mobile elements caused by the test voltages to take place; and
after the measurement, synchronise the opening of the second switch(es) and the closing of the first switch(es) such that the first switch(es) are not closed until the second switch(es) are opened.

In one embodiment, the detector circuit may be a differential amplifier.

The output multiplexer circuit may be configured to connect the first mobile mass to the first input of the detector and to connect the second mobile mass to the second input of the detector during normal operation of the device. During normal operation of the device (e.g. where the device is a differential acceleration sensor), acceleration of the device may typically cause the mobile elements to deflect in a common direction, so that a non-zero may be produced at the output of the detector circuit, even though the mobile elements are connected to different respective inputs of the detector circuit.

The input multiplexer circuit may be configured to apply the first set of monotonically increasing test voltages by continuously increasing the test voltage during the test mode. The increase may be a linear increase (ramp) over time. The input multiplexer circuit may also be configured to apply the second set of monotonically decreasing test voltages by continuously decreasing the test voltage during the test mode. The decrease may be a linear decrease (ramp) over time.

The input multiplexer circuit may be configured to apply the first set of monotonically increasing test voltages by increasing the test voltage in a series of discontinuous steps. The input multiplexer circuit may also be configured to apply the second set of monotonically decreasing test voltages by decreasing the test voltage in a series of discontinuous steps. The steps may be evenly spaced and the difference in voltage between adjacent steps may remain constant over the duration of the test.

In one embodiment, the output multiplexer circuit may further include one or more balancing capacitors and one or more switches configured selectively to connect either the first or the second input of the detector circuit to the one or more balancing capacitors during the test mode. The balancing capacitor(s) may minimise feedback factor mismatch and common mode noise conversion.

In one embodiment, the each mobile element may be a lever arm mounted on a pivot. The lever arm may have a short end located on a first side of the pivot and a long end located on a second side of the pivot opposite the first side.

Either end of the lever arm may include a stop. The stop may be located at a tip of that end of the lever.

BRIEF DESCRIPTION OF THE DRAWINGS

Embodiments of this disclosure will be described hereinafter, by way of example only, with reference to the accompanying drawings in which like reference signs relate to like elements and in which:

FIG. 1 schematically shows an example of a differential MEMS acceleration sensor device in operation;

FIGS. 2A and 2B schematically show an example of excitation voltages for a differential MEMS acceleration sensor;

DETAILED DESCRIPTION

Figure 3:
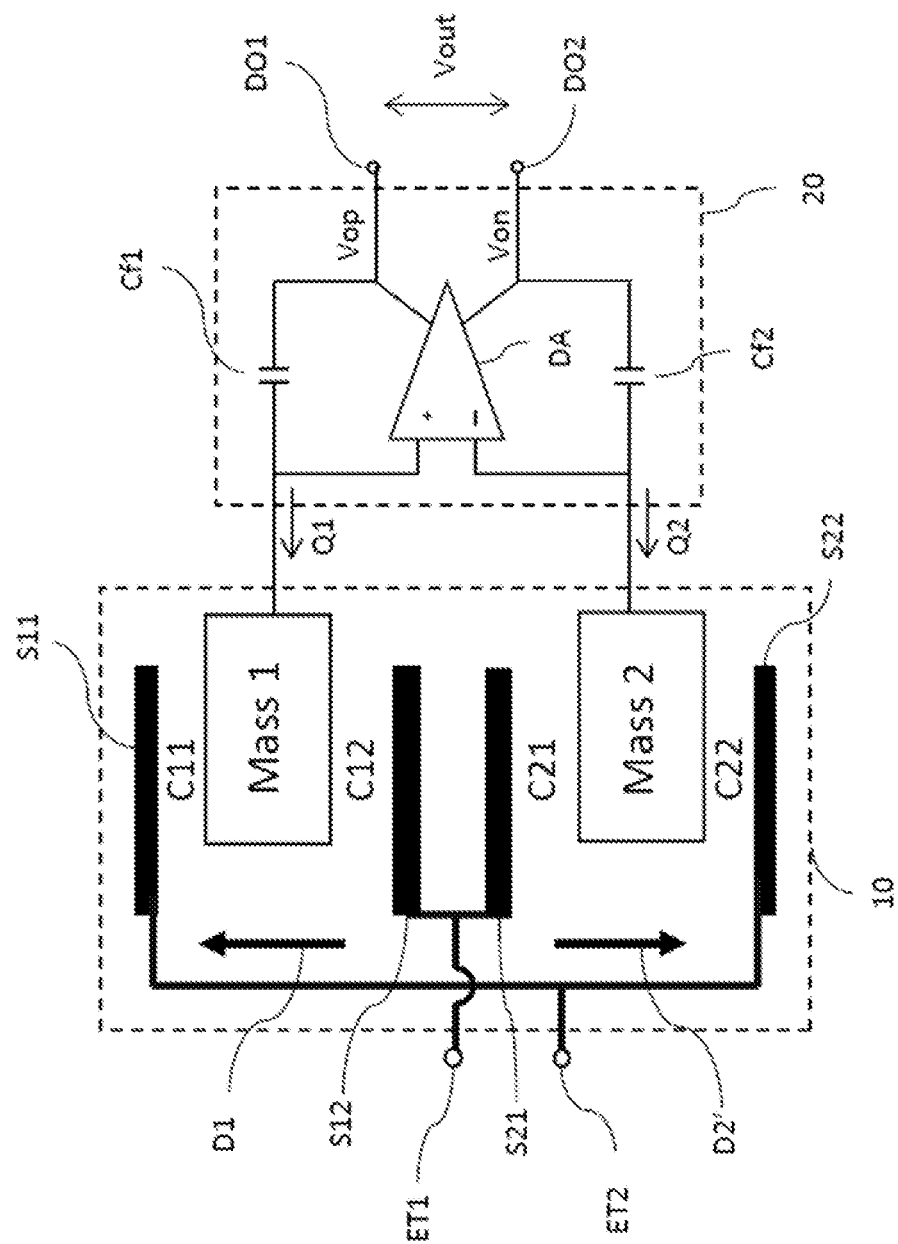
FIG. 3 schematically shows an example of a differential MEMS acceleration sensor device in a test mode.

Embodiments of this disclosure are described in the following with reference to the accompanying drawings.

As mentioned above, the terminals of MEMS sensors may have a dual use, serving both as excitation terminals and as test terminals, but the symmetry of the sensor can prevent an output signal being produced during a test. In embodiments of the invention, dual use of the terminals of differential MEMS sensors is made possible by reading the sensor values in an asymmetric manner. To this end, in embodiments of the invention switches can be used which in a test mode connect only a single input of the detector circuit with an output of the MEMS sensor. In embodiments of the invention, at least one further switch in a cross-connection can be used to connect only a single input of the detector circuit with two outputs of the MEMS sensor, so as to increase the sensitivity of the MEMS device.

In the following, for sake of understanding, the circuitry is described in operation. However, it will be apparent that the respective elements are arranged to perform the functions being described as performed by them.

A MEMS sensor device according to the Prior Art is schematically illustrated in FIG. 1. The device of FIG. 1 includes a sensor unit 10 and a detector unit 20. The sensor unit 10 includes a first movable mass labelled Mass 1 and a second movable mass labelled Mass 2. Each movable mass is arranged between two stationary plates: the first mass between plates S11 and S12, and the second mass between plates S21 and S22. Each plate is spaced apart from and faces a surface of a mass so as to constitute a capacitor C11, C12, C21 and C22 respectively. As the capacitance of a capacitor varies with the distance between its surfaces, a change in capacitance can represent a movement of the mass and hence an acceleration.

The masses are capable of moving, under the influence of acceleration, along at least one axis. In the example shown in FIG. 1, both masses move, due to acceleration, in the directions D1 and D2 respectively. It can be seen that in the present example, these directions are identical. It is noted that the arrangement shown in FIG. 1 is configured for detecting or measuring acceleration in one dimension only, for example the vertical direction (Y-axis). With two such arrangements, acceleration can be detected or measured in two dimensions, for example the horizontal and the vertical direction (X-axis and Y-axis). A further third arrangement (which need not be identical to the first two arrangements) allows acceleration to be detected in all three dimensions.

The inner plates S12 and S21 are connected to a first excitation terminal ET1 while the outer plates S11 and S22 are electrically connected to a second excitation terminal ET2. To these terminals, excitation voltages can be applied as illustrated in FIG. 2A. The excitation voltages serve to produce electrical currents corresponding to any displacement of electric charges due to capacitance changes. These currents (corresponding with the displacement of electric charges Q1 and Q2 in FIG. 1) can be detected by the detector unit 20 and be converted into an output voltage Vout indicative of the acceleration.

In the example of FIG. 2A, excitation voltages EV1 and EV2 equal to a reference voltage Vref are normally applied to the excitation or input terminals ET1 and ET2 respectively. In some applications, the voltage Vref may be 0.8 V or 1.0 V, but this will depend on the particular MEMS sensor. The movable masses Mass 1 and Mass 2 are normally also at the reference voltage Vref due to their connections with the detector unit 20. In some embodiments, the detector unit 20 may include additional components, such as resistors, for causing the input terminals of the detector and hence the masses to normally be at a voltage equal to the reference voltage Vref.

During an excitation phase, the first excitation voltage EV1 (indicated by the uninterrupted line), initially increases to 2×Vref while the second excitation voltage EV2 (indicated by an interrupted line) decreases to zero, thus creating a voltage difference of 2×Vref over the input terminals ET1 and ET2. This voltage difference will charge the capacitors C11, C12, C21 and C22. In the absence of acceleration, the capacitances of capacitors C11 and C12, for example, will be approximately equal, and the current flowing through capacitor C11 will be approximately equal to the current flowing through capacitor C12. In the presence of acceleration, however, the first movable mass will move, for example in the direction D1 indicated in FIG. 1. Due to this movement, the capacitance of capacitor C11 will increase (caused by the smaller distance between the plate S11 and Mass 1) while the capacitance of capacitor C12 will decrease (caused by the larger distance between the plate S12 and Mass 1). As a result, the current through capacitor C11 will be larger than the current through capacitor C12. This difference in current will be compensated by current flowing from the detector 20 into Mass 1, thus displacing an electrical charge Q1. As the second movable mass, when subject to acceleration, moves in the direction D2, which in the example of FIG. 1 is equal to the direction D1, a current corresponding with an electrical charge Q2 will flow into the second movable mass Mass 2.

In the example of FIG. 2A, the excitation phase includes a first excitation period Exc1 in which the first excitation voltage EV1 applied to the first excitation terminal ET1 is equal to 2Vref while the second excitation voltage EV2 applied to the second excitation terminal ET2 is equal to zero. The excitation phase can further include a second excitation period Exc2 in which the excitation voltages are reversed, the first excitation voltage EV1 being equal to zero and the second excitation voltage EV2 being equal to 2Vref. In this second excitation period, again in the presence of acceleration currents will flow due to charging and discharging of the capacitors. The reversion of the excitation voltages aids in removing measurement bias.

It is noted that the excitation phases shown in FIG. 2A are preceded by an idle phase in which the excitation voltages are constant and equal to Vref. In a typical embodiment, each excitation period may take approximately 10 μs (microseconds), but longer or shorter excitation periods may also be used.

Any flow of current towards (or from) the masses can be detected by the detector circuit 20, which in the present example includes a differential amplifier DA having a dual output: a high output and a low output. Any voltage difference between these outputs constitutes the output voltage Vout which represents acceleration. In the absence of acceleration, the change in capacitance of each pair of capacitors (S11 & S12; S21 & S22) is zero, resulting in a zero output signal Vout.

The excitation terminals ET1 and ET2 also can be used as test electrodes for applying a test signal to the sensor. This dual use of the electrodes eliminates the need for separate test electrodes and thereby saves space in the MEMS sensor. To test the MEMS sensor, the excitation voltages EV1 and EV2 can be used in a test sequence, an example of which is schematically illustrated in FIG. 2B.

In the test sequence of FIG. 2B, excitation periods Exc1 and Exc2 are preceded by a test period. The first excitation period Exc1 is separated from the test period by an intermediate period in which the excitation voltages EV1 and EV2 are equal to the reference voltage Vref. The time duration Δt of this intermediate period may for example be 4 μs (microseconds). During the test period, the second excitation voltage EV2 is, in the present example, equal to twice the reference voltage, while the first excitation voltage EV1 is equal to Vref. This causes a voltage difference equal to Vref over the input terminals ET1 and ET2 and hence over the plate pairs S11-S12 and S22-S21, the plates S11 and S22 having a higher voltage (2.Vref) than the plates S12 and S21 (Vref). This will cause the masses to be attracted to the plates S11 and S22. As the masses have the same voltage (Vref) as the inner plates S12 and S21 which are connected to the first input terminal ET1, the masses will neither be attracted to nor be repulsed by these inner plates. Thus, due to the attraction to the outer plates S11 and S22 connected to the second input terminal ET2, the masses will move towards these outer plates. This is illustrated in the Prior Art arrangement of FIG. 3, where the plates are shown to move in opposite directions D1 and D2'.

The movement of the masses will cause the displacement of electrical charges Q1 and Q2 and will hence cause currents to flow, which should be detected by the detector circuit. However, as in a test phase the masses move in opposite directions, the currents flowing into each mass will be equal. As a result, the differential amplifier DA will fail to detect any change during the excitation periods of the test phase. As a result, testing a differential MEMS sensor device by using the excitation terminals as test electrodes yields no meaningful result unless additional measures are taken.

Figure 4:
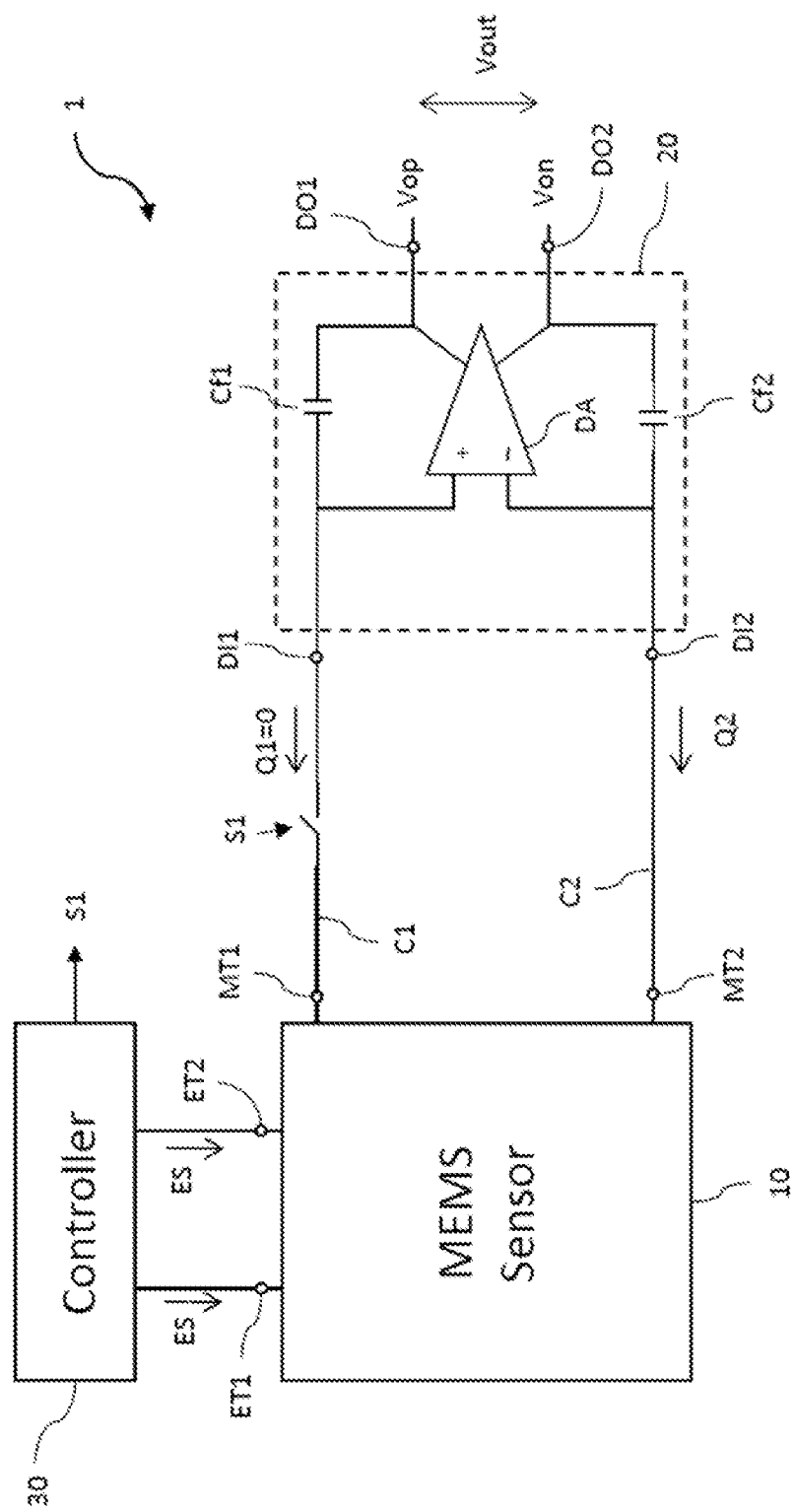
FIG. 4 schematically shows a first embodiment of a MEMS sensor device according to this disclosure.

A MEMS sensor device according to an embodiment of the invention is schematically illustrated in FIG. 4. The exemplary MEMS sensor device 1 of FIG. 4 includes a MEMS sensor 10, a detector circuit 20 and a controller 30. The device 1 may contain further components which are, however, not shown in FIG. 4 for the sake of clarity of the illustration.

The MEMS sensor 10 may be a differential dual mass acceleration sensor as illustrated in FIGS. 1 and 3 but the invention is not so limited. More in particular, the MEMS sensor may be an acceleration sensor having four or six masses, for example, or be a differential pressure sensor. The MEMS sensor includes a first excitation (or input) terminal ET1, a second excitation (or input) terminal ET2, a first mass (or output) terminal MT1 and a second mass (or output) terminal MT2. When the MEMS sensor is an acceleration sensor as illustrated in FIGS. 1 and 3, the mass terminals can be connected to the movable masses. It is noted that the acceleration sensor illustrated in FIGS. 1 and 3 can be realized in a small integrated circuit, as the acceleration sensor has only two excitation terminals (ET1 and ET2 in FIGS. 1 and 3) and therefore only requires two connection pads on the integrated circuit. Such an acceleration sensor reduces both the number of electrical connections and the surface area of the integrated circuit, compared with acceleration sensors having a larger number of excitation terminals.

The detector circuit 10 of FIG. 4 includes a first detector input terminal DI1, a second detector input terminal DI2, a first detector output terminal DO1 and a second detector output terminal DO2. The detector circuit 20 can include a differential amplifier DA having a positive input and a negative input connected to the first detector input terminal and the second detector input terminal respectively. The differential amplifier DA has a dual output: a positive output connected with the first detector output DO1 and providing a positive output voltage Vop, and a negative output connected with the second detector output DO2 and providing a negative output voltage Von. The difference between the positive output voltage Vop and the negative output voltage Von can constitute the detector output voltage Vout. The detector circuit further includes a first feedback capacitor Cf1 arranged between the positive input and the positive output of the differential amplifier DA, and a second feedback capacitor Cf2 arranged between the negative input and the negative output of the differential amplifier DA. In addition to providing a feedback loop, these capacitors (which are not to be confused with the capacitors of the sensor) provide the electrical charges Q1 and Q2 which may be fed to the sensor 10. It is noted that the currents corresponding to the charges Q1 and Q2 may flow towards the sensor 10 and therefore away from the detector 20, or in the opposite direction. Still, the terminals DI1 and DI2 are labelled detector inputs as from a voltage point of view they constitute input terminals.

The controller 30 provides, in the embodiment shown, excitation signals ES to the excitation (or input) terminals ET1 and ET2 of the sensor 10. These excitation signals may correspond to those illustrated in FIGS. 2A and 2B. In addition, the controller provides, in the embodiment shown, control signals to the switch S1, which will be explained below (for the sake of clarity of the illustration, the connection between the controller 30 and the switch S1 is indicated by means of an arrow only). In some embodiments, two separate controllers may be provided, one for supplying excitation signals and one for supplying switch control signals. In the embodiment shown in FIG. 4, a single integrated controller is shown.

A first connection C1 is shown to connect the first mass (or output) terminal MT1 of the MEMS sensor 10 with the first detector input DI1. Similarly, a second connection C2 is shown to connect the second mass (or output) terminal MT2 of the MEMS sensor 10 with the second detector input DI2. As explained with reference to FIG. 3, applying a test sequence of excitation voltages to a symmetrical sensor connected to a differential detector will typically produce no non-zero output voltage. In embodiments of the invention, therefore, only one input of the detector circuit is connected to the sensor. To this end, in the embodiment of FIG. 4 a (first) switch S1 is provided in the first connection C1 to disconnect the first input DI1 of the detector 20 from the sensor 10 during a test phase. When the switch S1 is open, as shown, current can flow through the second connection C2 only. As a result, only one input (in the present example: DI2) is connected to the MEMS sensor 10, more in particular, to the second output terminal MT2 of the MEMS sensor. In this manner, the detector 10 receives asymmetric input. Any displacement of electrical charges (Q2) will only be detectable at the second detector input DI2, as no current will flow at the first detector input DI1. The detector 20 will therefore, in response to a test sequence as illustrated in FIG. 2B, produce a non-zero output signal Vout. In contrast to the prior art, the asymmetrical arrangement of the present invention allows the excitation terminals ET1 and ET2 to be used as test terminals for testing, for example, an acceleration sensor having an even number of masses.

The switch S1 is open during a test phase only, for example when a sequence of test voltages as shown in FIG. 2B is applied. During normal operation of the device, which may also be referred to as sensing mode, the switch S1 is closed so that each input of the detector circuit 20 is connected to a corresponding output of the sensor 10. The controller 30 is configured for closing the switch S1 during normal operation, and for opening the switch when testing the sensor. In addition, the controller 30 produces regular excitation signals ES during normal operation and test excitation signals (for example having a test signal preceding the regular excitation signals as illustrated in FIG. 2B) during a test phase. The controller is further configured for synchronising the opening and closing of the switch with the production of suitable excitation signals.

In the embodiment of FIG. 4, the first connection C1 is provided with a switch so as to provide an interruptible connection between the sensor and the detector. It will be understood that a single switch (S1 in FIG. 4) may alternatively be accommodated in the second connection C2, the first connection C1 being permanent.

Figure 5:
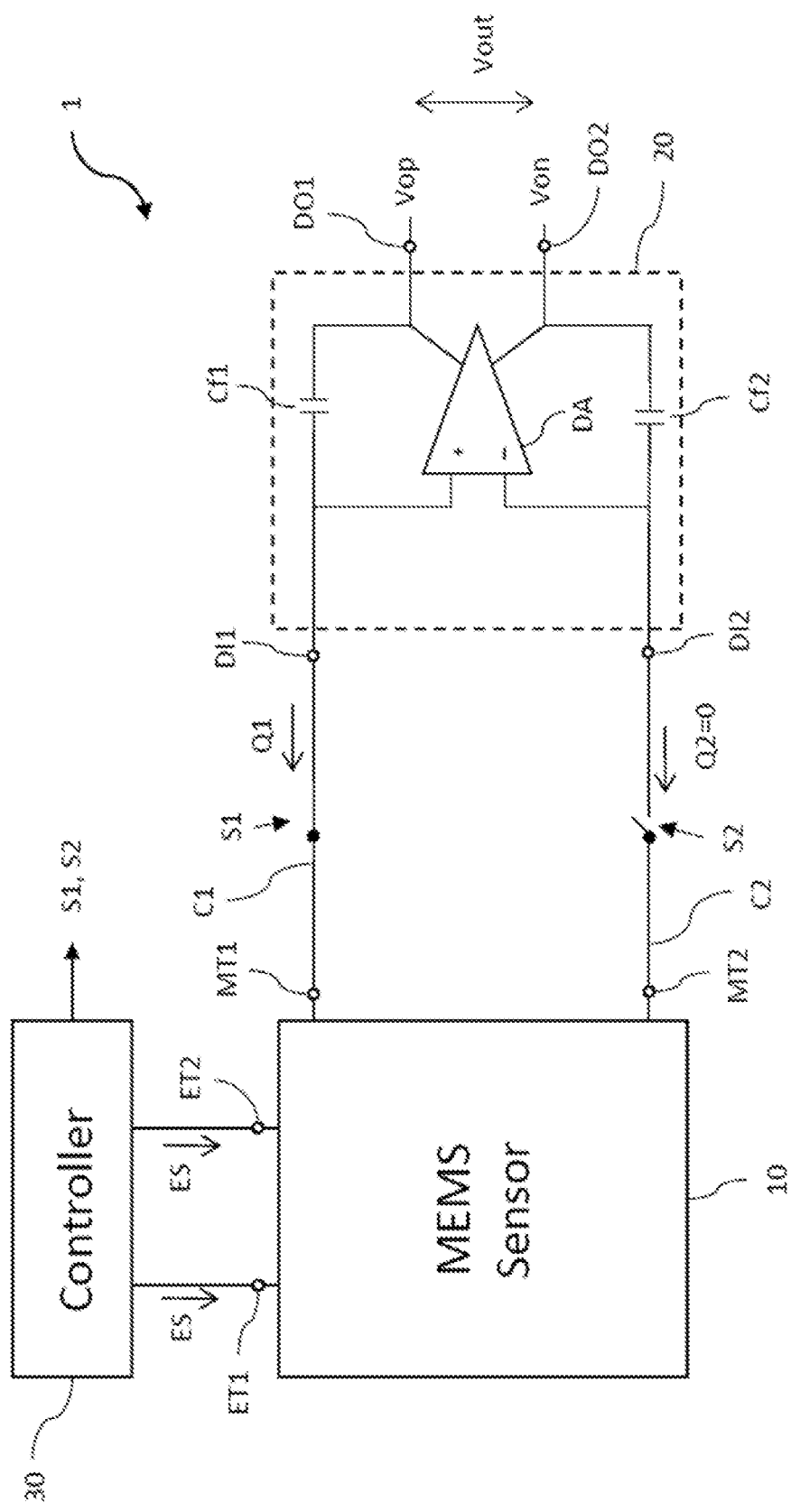
FIG. 5 schematically shows a second embodiment of a MEMS sensor device according to this disclosure.

In the embodiment of FIG. 5, both connections C1 and C2 are provided with a switch. A first switch S1 is provided in the first connection C1, while a second switch S2 is provided in the second connection C2. This arrangement allows to alternatingly open one of the switches during a test phase, while closing both switches during normal operation. In the state shown in FIG. 5, switch 1 is closed, thus connecting the first output MT1 of the sensor with the first input DI1 of the detector circuit, while switch 2 is open, thus disconnecting the second output MT2 from the second input DI2.

It is noted that by closing the first switch S1, a first movable mass (for example Mass 1 in FIGS. 1 and 3) can be tested, while by closing the second switch S2, a second movable mass (for example Mass 2 in FIGS. 1 and 3) can be tested. This allows two masses to be tested independently.

Figure 6:
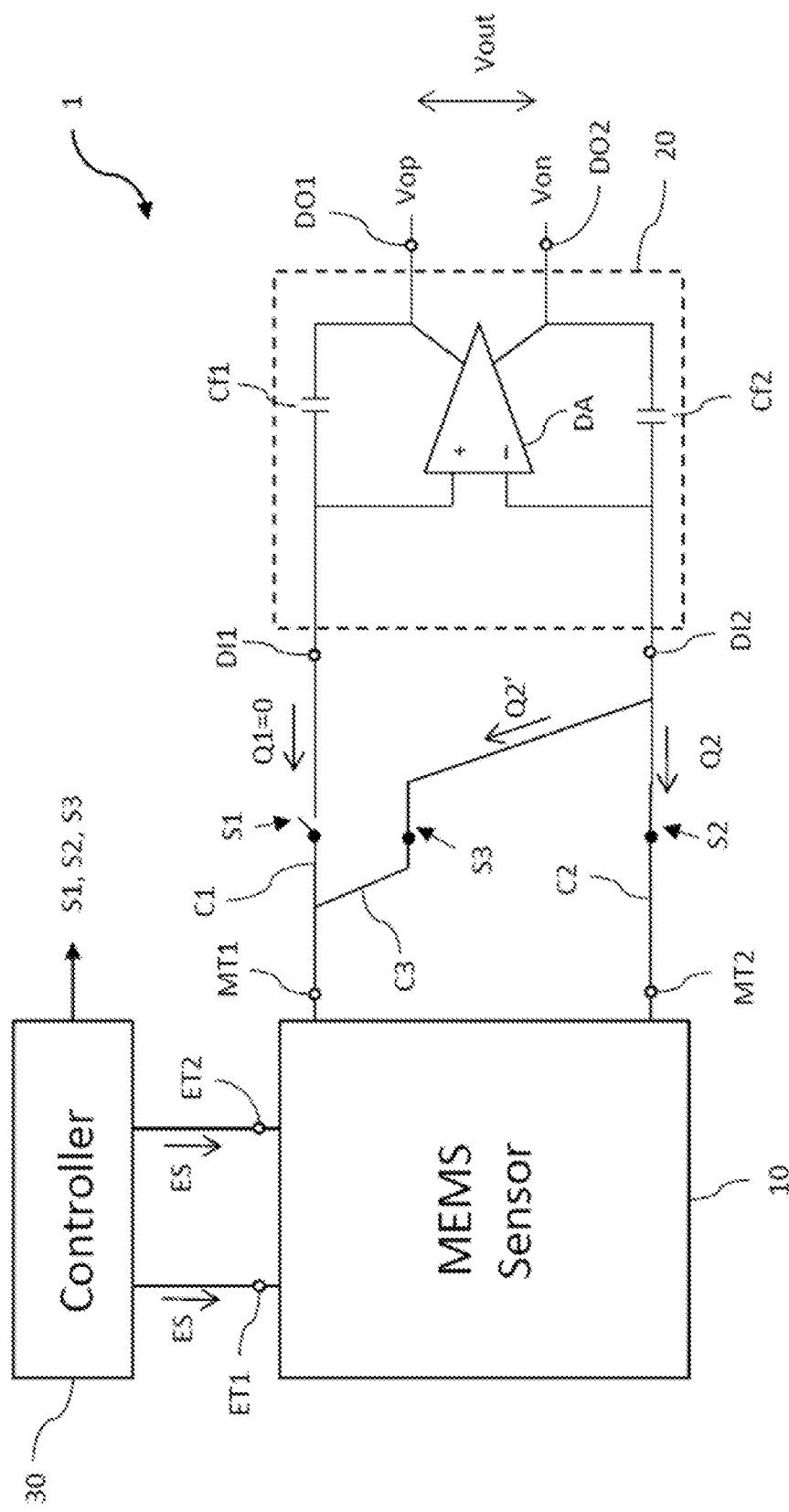
FIG. 6 schematically shows a third embodiment of a MEMS sensor device according to this disclosure.

In the embodiment of FIG. 6, an additional connection C3 is provided between the first output (or MEMS terminal) MT1 of the sensor 10 and the second input (or detector input) DI2 of the detector 20. This cross-over connection C3, which is provided with a third switch S3, allows a single input of the detector circuit to be connected with both outputs of the sensor. In this way, both masses are connected with a single detector input, thus doubling the current that can flow during a test phase and thereby increasing the sensitivity and the accuracy of the test. In the test state shown in FIG. 6, the first switch S1 is open so as to disconnect the first detector input DI1, while the second switch S2 and the third switch S3 are closed to connect both sensor outputs MT1 and MT2 with the second detector input DI2. The addition of the third connection C3 allows additional electrical charge Q2' to reach the sensor. It will be understood that during normal (non-testing) operation of the arrangement of FIG. 6, switches S1 and S2 will be closed while switch S3 will be open. The switches S1, S2 and S3 can be operated by the controller 30.

Figure 7:
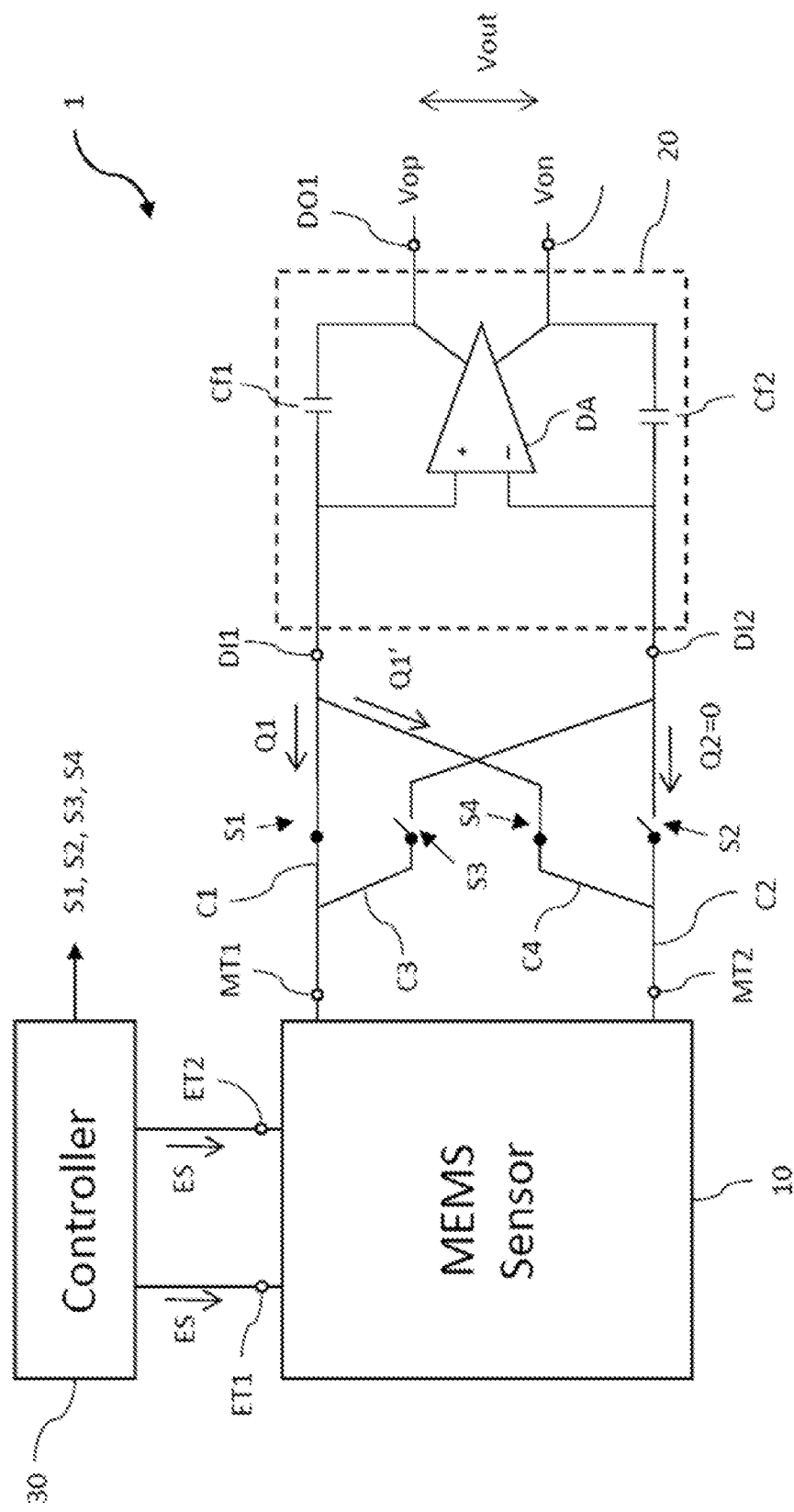
FIG. 7 schematically shows a fourth embodiment of a MEMS sensor device according to this disclosure.

In the embodiment of FIG. 7, a fourth connection C4 is arranged between the second sensor output MT2 and the first detector input DI1. This fourth connection C4 is provided with a fourth switch S4 which is open during normal operation but can be closed to allow additional charge to reach the sensor. Typically, S4 will only be closed when S1 remains closed during the test phase. Similarly, only one of S3 and S4 will be closed during a test phase. As in the previous embodiments, the switches can all be controlled by the controller 30.

It can be seen that the cross-connections C3 and C4 and their associated switches S3 and S4 can also be used to invert the connections between the sensor 10 and the detector 30 during normal operation: by opening the first switch S1 and the second switch S2 and closing the third switch S3 and the fourth switch S4, the first sensor output MT1 is connected to the second detector input DI2, and vice versa. This allows a double measurement which enables to remove any offset of the detector circuit.

Figure 8:
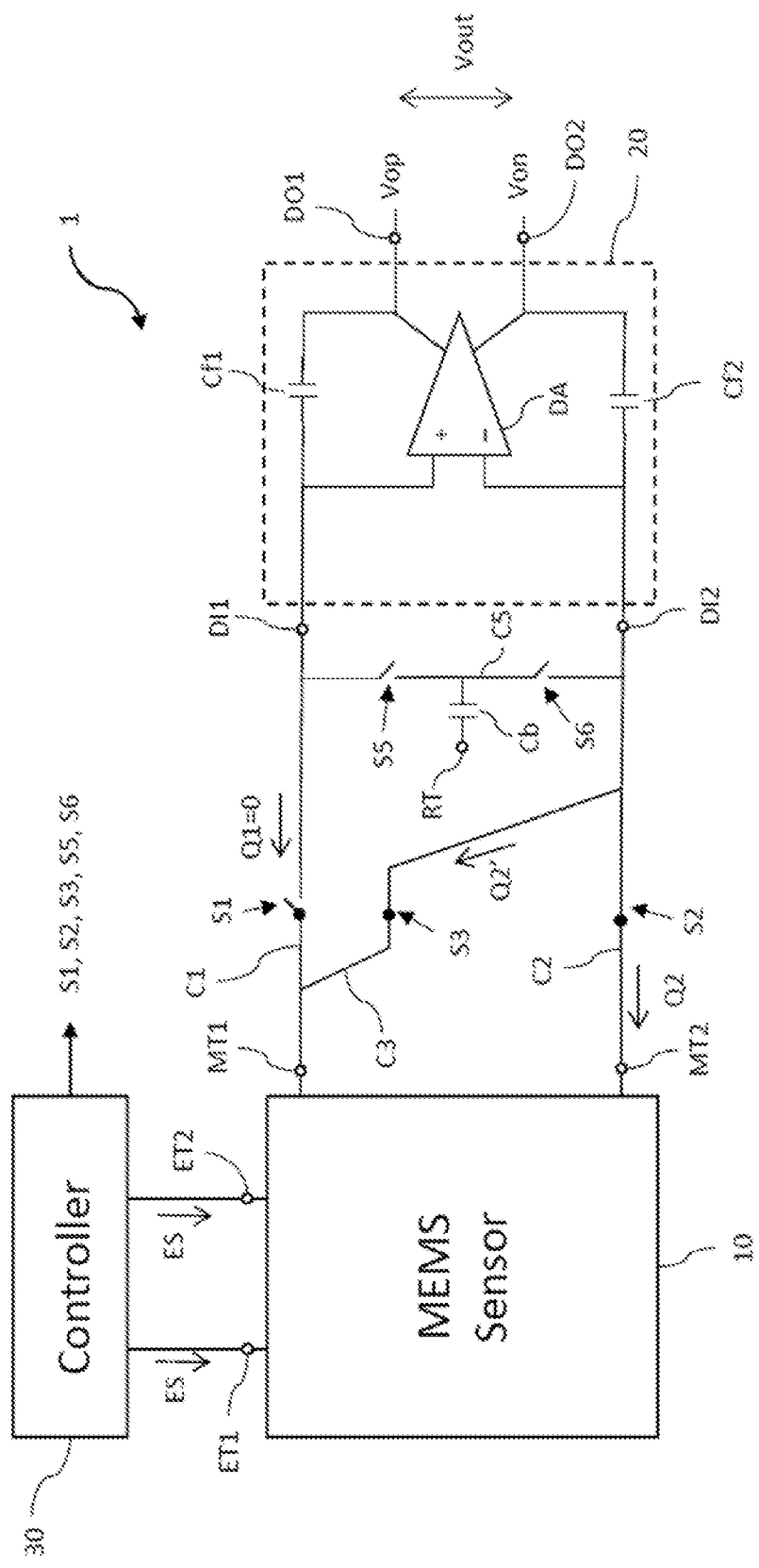
FIG. 8 schematically shows a fifth embodiment of a MEMS sensor device according to this disclosure.

In the embodiment of FIG. 8, a balancing capacitor Cb is added to the configuration of FIG. 6 in order to minimise feedback factor mismatch and common mode noise conversion. The balancing capacitor is arranged between a reference terminal RT and an additional connection C5 which is in turn arranged between the detector input terminals DI1 and DI2. The additional connection C5 is provided with two switches S5 and S6 arranged in series, at least one of which should normally be open to prevent short-circuiting the detector inputs. By alternatingly closing one of the switches S5 and S6, one of the detector input terminals DI1 and DI2 can be connected with the capacitor Cb. The reference voltage Vref can be applied to the reference terminal RT.

The single balancing capacitor Cb may be replaced with two or more capacitors arranged in parallel, and further switches in the connection C5 may be used to connect one or more of these parallel capacitors with either or both of the detector input terminals.

It will be understood that combinations of the embodiments described above may be made without departing from the scope of the invention. For example, the embodiment of FIG. 7 having two cross-connections C3 and C4 may be combined with the capacitor arrangement of FIG. 8. Similarly, the capacitor arrangement of FIG. 8 may also be applied in the embodiment of FIG. 3.

Figure 9:
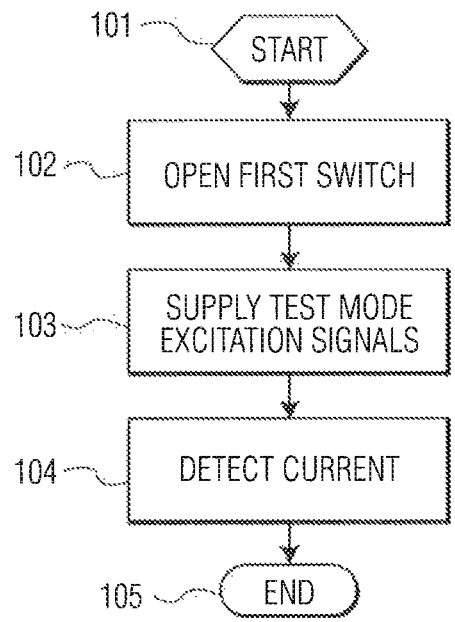
FIG. 9 schematically shows a first embodiment of a MEMS device operating method according to this disclosure.

An exemplary embodiment of a method of operating a MEMS device in accordance with the invention is schematically illustrated in FIG. 9. The embodiment of FIG. 9 includes an initial step 101 ("Start"), followed by a step 102 in which a first switch in a connection between the MEMS device and a detector circuit is opened. The first switch of step 102 may correspond to the first switch S1 shown in FIGS. 4 to 8, but may also correspond to the second switch S2 of FIGS. 4 to 8, for example. In a third step 103, test mode excitation signals are supplied to the excitation terminals of the MEMS device, for example the excitation terminals ET1 and ET2 shown in FIGS. 1 and 3. In a fourth step 104, any currents flowing into or from the MEMS device are detected by a detector circuit, for example the detector circuit 20 illustrated in FIGS. 4 to 8. The method ends in a fifth step 105.

Figure 10:
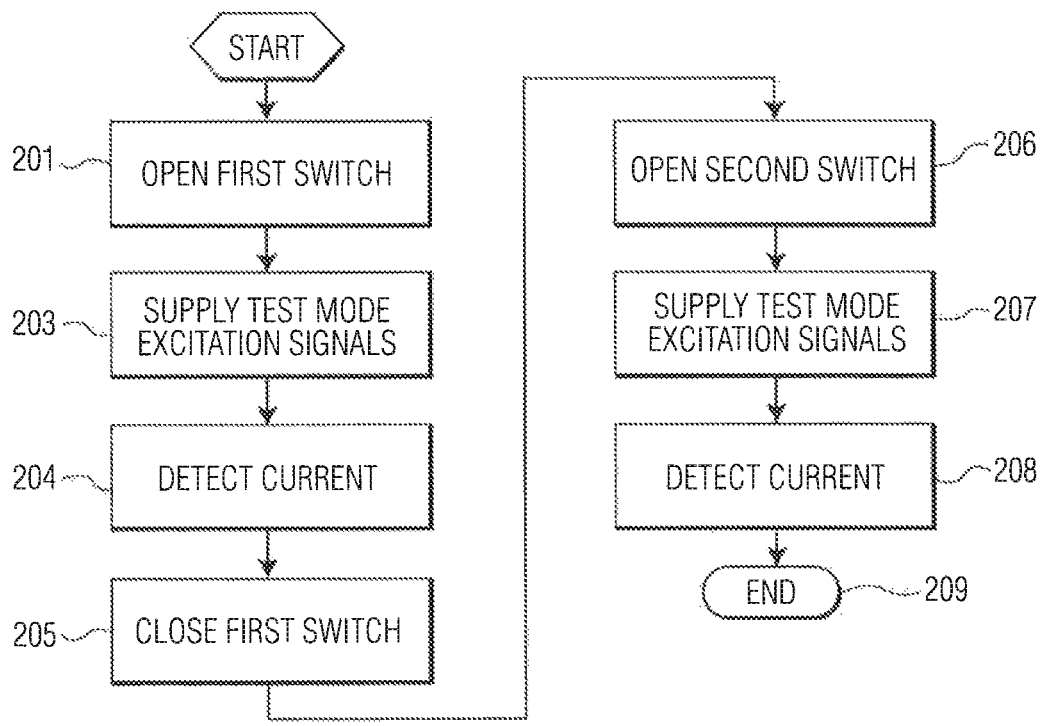
FIG. 10 schematically shows a second embodiment of a MEMS device operating method according to this disclosure.

Another exemplary embodiment of a method of operating a MEMS device in accordance with the invention is schematically illustrated in FIG. 10. The embodiment of FIG. 10 includes an initial step ("Start"), followed by a step 201 in which a first switch in a connection between the MEMS device and a detector circuit is opened. The first switch of step 201 can correspond to the first switch S1 shown in FIGS. 4 to 8, but may also correspond to the second switch S2 of FIGS. 4 to 8, for example. In a third step 203, test mode excitation signals are supplied to the excitation terminals of the MEMS device, for example the excitation terminals ET1 and ET2 shown in FIGS. 1 and 3. In a fourth step 204, any currents flowing through the outputs of the MEMS device are detected by a detector circuit, for example the detector circuit 20 illustrated in FIGS. 4 to 8.

In a fifth step 205, which terminates a first test mode, the first switch is closed. In a sixth step 206, which initiates a second test mode, a second switch is opened. The second switch of step 206 can correspond to the second switch S2 shown in FIGS. 4 to 8, but may also correspond to the first switch S1 of FIGS. 4 to 8, for example. In a seventh step 207, test mode excitation signals are supplied to the excitation terminals of the MEMS device, for example the excitation terminals ET1 and ET2 shown in FIGS. 1 and 3. In an eighth step 208, any currents flowing through the outputs of the MEMS device are detected by a detector circuit, for example the detector circuit 20 illustrated in FIGS. 4 to 8. The method ends in a ninth step 209. By using two test modes, a different switch being open in each test mode, the test can be carried out more accurately as any biases can be compensated.

It is noted that in embodiments of the present invention switches can be used to connect one or more movable masses with only one input of a detector circuit. In a typical embodiment, the masses remain electrically isolated from the excitation (or input) terminals of the sensor. In this way, both plates of each pair of plates associated with a mass can be used to attract or repel the mass.

In embodiments of the present invention the MEMS sensor 10 can be an acceleration sensor, such as the acceleration sensor illustrated in FIGS. 1 and 3. This type of acceleration sensor has the advantage of including only two excitation terminals, thus reducing the surface area required for connection pads and the number of electrical connections. This property of insensitivity to physical acceleration during self-test (i.e. test mode in which masses are displaced by means of test voltages) is true only when both masses are connected together to one input of the detector circuit. If only one mass is connected to the detector circuit, then the displacement measured by the detector is the sum of the displacement due to physical acceleration and the displacement due to test voltage (electrostatic force).

In other embodiments of the invention MEMS acceleration sensors or other MEMS sensors having more than two excitation terminals, for example four or eight excitation terminals, may be used.

Embodiments of the invention may be described as a micro-electro-mechanical system (MEMS) device including a micro-electro-mechanical system (MEMS) sensor, a detector circuit, a controller circuit coupled with the MEMS sensor, a first connection arranged between a first output of the MEMS sensor and a first input of the detector circuit, a second connection arranged between a second output of the MEMS sensor and a second input of the detector circuit, and a first switch arranged in the first connection, wherein the controller circuit is configured to open the first switch during a first test mode so as to connect only a single input of the detector circuit with an output of the MEMS sensor.

Further embodiments of the invention may be described as a MEMS device further including a second switch arranged in the second connection, wherein the controller circuit is further configured to close the second switch during the first test mode. The controller circuit may further be configured to during the first test mode, open the first switch and close the second switch, and during a second the test mode, close the first switch and open the second switch, so as to alternatingly connect a single input of the detector circuit with an output the MEMS sensor.

Embodiments of the invention provide a consumer device, such as an airbag, provided with a MEMS sensor device as described above. Further embodiments of the invention provide a method of operating a micro-electro-mechanical system (MEMS) device, including opening a first switch between a first output of a MEMS sensor and a first input of a detector circuit during a first test mode so as to connect only a single input of the detector circuit with an output of the MEMS sensor.

The controller function of embodiments of the present invention may be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD ROM or diskette, stored with data loadable in a memory of a computer system, the data representing the computer program. The data carrier may further be a data connection, such as a telephone cable or a wireless connection.

In accordance with embodiments of this disclosure, there may be provided a micro-electro-mechanical system (MEMS) device including features for performing a C(V) sweep to test for stiction of one or more mobile elements of thereof. The device may include an input multiplexer circuit configured to connect electrodes of the MEMS device to a test voltage source during a test mode for applying test voltages of the C(V) sweep to the electrodes for deflecting the mobile elements of the MEMS device. The device may also include an output multiplexer circuit comprising one or more switches configured selectively to connect one or more mobile elements of the MEMS device to a single one of the first and second inputs of a detector circuit during the test mode. In some examples, the detector circuit may include a detector unit 20 (e.g. a differential amplifier (DA)) of the kind described above, and the output multiplexer may include an arrangement of connections and switches of the kind described above in relation to any of FIGS. 4 to 8.

Figure 11:
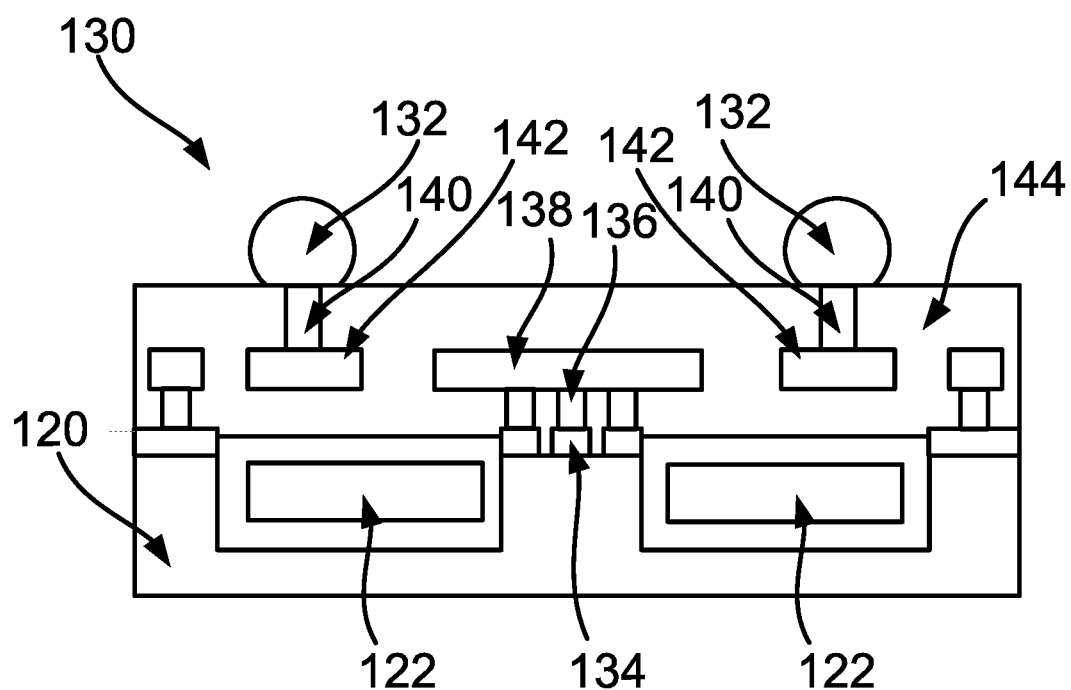
FIG. 11 shows a MEMS sensor device in accordance with an embodiment of this disclosure.

FIG. 11 shows a MEMS device 130 in accordance with an embodiment of this disclosure. The device 130 includes a MEMS substrate 120 including MEMS components 122. The MEMS components 122 may include one or more mobile elements. The MEMS component(s) 122 may, for instance be a gyroscope, differential accelerometer, pressure sensor and/or timing device. The MEMS components 122 may, for instance comprise features such as levers, cantilevers, membranes, oscillators, mechanical switches, electrodes etc. The exact configuration of the MEMS component(s) 122 is not essential to this disclosure, and indeed the MEMS components themselves may be conventional.

The device 130 in this example also includes an Application Specific Integrated Circuit (ASIC) substrate 144, which is bonded to a major surface of the MEMS substrate 120. Each substrate 120, 144 may comprise silicon. The bonding of the ASIC substrate 144 to a major surface of the MEMS substrate 120 as shown in FIG. 1 may provide physical protection for the mobile elements of the MEMS components 122, in a manner that need not require the presence of a separate cap substrate.

The ASIC substrate 144 may include a sensing circuit 138, for operating the MEMS components. The sensing circuit 138 may be provided with electrical connections for connecting it to the MEMS components 122. These connections may include electrical connections 136 passing through the ASIC substrate 144 to connect with contacts 134 (comprising e.g. AlGe) located on a major surface of the MEMS substrate 120.

The device 130 may form a wafer level chip scale package (WLCSP), mountable on the surface of a carrier such as a printed circuit board (PCB). The ASIC substrate 144 may also include one or contacts such as solder balls 132 located on an opposite major surface of the substrate 144 to the major surface of the substrate 144 that is attached to the MEMS substrate 120. Connections such as through silicon vias (TSVs) 140 filled with electrically conductive material may be provided beneath the solder balls 132, to form connections between the solder balls 132 and I/O circuitry 142 of the device 130.

The arrangement shown in FIG. 11 can allow the ASIC substrate 144 to provide physical protection for the MEMs components 122 of the device 130, allowing a separate cap to be dispensed with. This can allow the device 130 to be compact and robust. However, a potential drawback of this arrangement is that it may not be possible to access MEMs contacts (e.g. the contacts 1134) once the ASIC substrate 144 has been attached to the MEMs substrate 120. This means that it may not be possible to characterize the MEMS mobile structures and to detect stiction occurrences using ASIC Test Equipment (ATE) as described previously. Accordingly, the use of ATE may not be possible, for performing C(V) sweep testing to actuate the mobile elements of the MEMS components 122 up to their mechanical stops and check for stiction. Embodiments of this disclosure may allow C(V) sweep capability in a MEMS device, for instance in a device 130 of the kind described above.

As described herein, the device 130 in FIG. 11 may include electrodes which may be used both as excitation terminals and the test terminals of the device. Accordingly, the same electrodes may be used:

(i) to apply test voltages to cause deflection of the mobile elements of the MEMS components 122 during a C(V) sweep in a test mode, and (ii) to supply excitation voltages to the sensor to allow a desired parameter to be sensed or measured during normal operation of the device.

Furthermore, and as will be described in more detail below, the electrodes may be used to supply excitation voltages to the sensor to allow the deflection of the mobile elements during the C(V) sweep in test mode to be detected. These excitation voltages may be substantially lower than those used to cause the deflection of the mobile elements during the test mode. In view of this, the excitation voltages and the test voltages may be supplied by different voltage sources.

Figure 12:
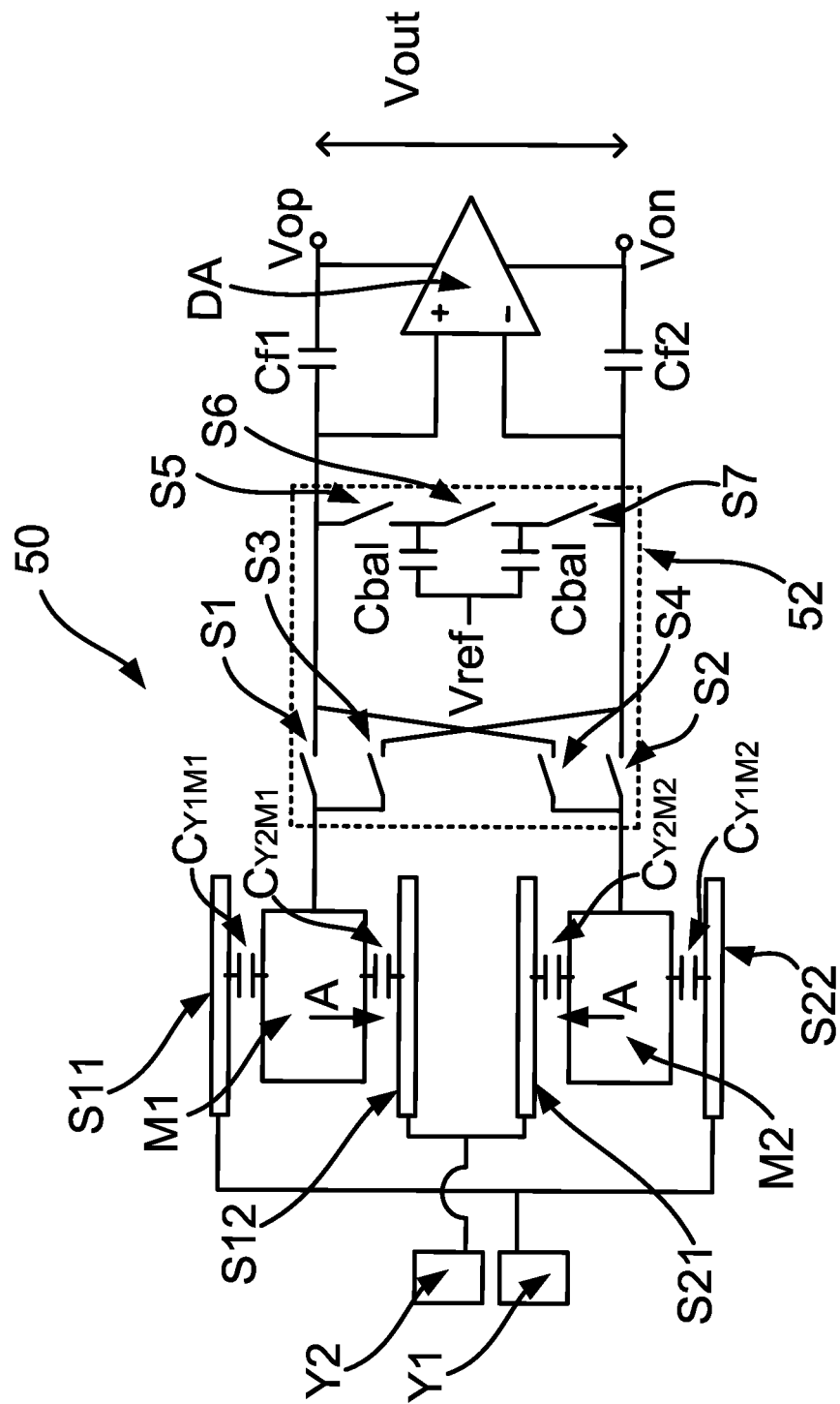
FIG. 12 shows a MEMS sensor device in accordance with an embodiment of this disclosure.

FIG. 12 shows a MEMS sensor device 50 in accordance with an embodiment of this disclosure. The device 50 includes two mobile elements M1 and M2. The device 50 also includes a first pair of electrodes S11, S12, which are associated with the first mobile element M1. The device 50 further includes a second pair of electrodes S21, S22, which are associated with the second mobile element M2. The pairs of electrodes S11, S12 and S21, S22 are arranged to deflect their respective mobile elements M1, M2 by the application of a voltage across them. As has been described previously, these voltages may be applied using terminals such as terminals Y1 and Y2.

The drawing in FIG. 12 is schematic in the sense that it is envisaged that in some embodiments the electrodes S11, S22 may in fact be a single electrode shaped and positioned so that a voltage can be applied to both of the mobile elements M1 and M2 using the terminal Y1. In this sense, the electrodes S11, S22 may be considered to be portions of a single electrode, or may alternatively be provided as separate electrodes, both connected to the terminal Y1. Similarly, the electrodes S12, S21 may in fact be a single electrode shaped and positioned so that a voltage can be applied to both of the mobile elements M1 and M2 using the terminal Y2. In this sense, the electrodes S12, S21 may be considered to be portions of a single electrode, or may alternatively be provided as separate electrodes, both connected to the terminal Y2. An example of an arrangement of single electrodes (instead of electrode pairs as shown schematically in FIG. 12) for applying voltages to two mobile masses will be described in relation to FIG. 15 below.

As will described further below, the terminals Y1 and Y2 may be connected to an input multiplexer for the selective application of test voltages during a test mode of the device. As also described previously, the electrodes S11, S12 and S21, S22 may be used to supply excitation voltages to allow a desired parameter (typically a deflection of the mobile elements M1, M2) to be sensed or measured during normal operation of the device 50. The input multiplexer may also arranged to apply these excitation voltages. It will be appreciated that further electrodes may be provided, associated with additional degrees of freedom of movement of the masses M1, M2. For simplicity and brevity, FIG. 12 shows only electrodes associated with movement of the mobile elements M1, M2 in the Y direction, however similar electrodes may also be provided, which may be associated with the movement of the mobile elements M1, M2 in the X and/or Z direction.

The capacitances between the electrodes S11, S12 and S21, S22 and the mobile masses with which they are associated are denoted by $C_{Y1M1}$, $C_{Y2M1}$, $C_{Y2M2}$, $C_{Y1M2}$, respectively.

The device 50 also includes an output multiplexer shown generally at 52. The output multiplexer 52 may be configured similarly to the arrangements described above in relation to FIGS. 4 to 8. In the present example, the output multiplexer 52 includes a plurality of switches, such as the switches S1, S2, S3, S4, S5, S6, S7. The switches S1, S2, S3, S4 and their associated connections in this example are configured similarly to the switches S1, S2, S3, S4 described above in relation to FIG. 7.

The device 50 in this example also includes a detector circuit including a differential amplifier DA and feedback capacitors Cf1 and Cf2. The detector circuit may include similar features to, and may operate in the same way to the detector unit 20 described above in relation to FIGS. 4 to 8 (for instance compare FIG. 12 with FIG. 7).

During normal operation of the device 50, the switches S1 and S2 may be closed, thereby to connect the mobile element M1 to a first input of the differential amplifier DA and the mobile element M2 to a second input of the differential amplifier DA. This may allow the detector circuit to operate in the way described previously, for allowing a desired parameter (typically the deflection of the mobile elements M1, M2) to be sensed or measured during normal operation of the device 50. In this mode, the switches S3, S4, S5, S6 and S7 may be left open.

During a test mode of the device, the switches may be configured as follows: S1: closed; S2: open; S3: open; S4: closed; S5: open; S6: closed; S7: closed. This configuration of the switches S1, S2, S3, S4 has the effect, as already described in relation to, for instance, FIG. 7, of connecting both mobile elements M1, M2 to a single input of the differential amplifier. It is envisaged that an alternative configuration of the switches may connect both mobile elements M1, M2 to another of the two inputs of the differential amplifier: S1: open; S2: closed; S3: closed; S4: open; S5: closed; S6: closed; S7: open. Further configurations of the switches may be selected such that only one of the mobile elements M1, M2 is connected to the differential amplifier DA, with the other mobile mass being disconnected from the differential amplifier. For instance:

the configuration S1: closed; S2: open; S3: open; S4: open; S5: open; S6: open; S7: closed, would connect only the mobile element M1 to one input of the differential amplifier DA;

the configuration S1: open; S2: open; S3: open; S4: closed; S5: open; S6: open; S7: closed, would connect only the mobile element M2 to one input of the differential amplifier DA;

the configuration S1: open; S2: open; S3: closed; S4: open; S5: closed; S6: open; S7: open, would connect only the mobile element M1 to the other input of the differential amplifier DA; and the configuration S1: open; S2: closed; S3: open; S4: open; S5: closed; S6: open; S7: open, would connect only the mobile element M2 to the other input of the differential amplifier DA.

In this way, a C(V) sweep may be performed on each mobile element individually.

Whichever configuration is chosen, the output multiplexer 52 may thus, in the test mode, connect the first mobile element M1 and/or the second mobile element M2 to a single one of the inputs of the differential amplifier DA of the detector circuit.

As explained previously, by connecting the or each mobile element M1, M2 to a single one of the inputs of the differential amplifier, the application of test voltages to the terminals Y1, Y2, which would generally result in the mobile elements M1, M2 moving in opposite directions (as shown by the arrows labelled "A" in FIG. 12), may allow the deflections of the mobile elements M1, M2 to be detected by the detector circuit, even though the symmetry of the mobile elements would normally give rise to a zero output from the differential amplifier if the mobile elements M1 and M2 were simply connected to respective inputs of the differential (as during normal operation).

The capacitors Cba1 in FIG. 12 are balancing capacitors connected to a reference voltage Vref. These balancing capacitors Cba1 operate similarly to the balancing capacitor Cb described above in relation to FIG. 8. The switches S5, S6, S7 may be opened and closed by the output multiplexer during the test mode (e.g. according to the switch configurations described above), to connect them to the input of the differential amplifier DA that is not connected to either of the mobile masses.

Figure 13:
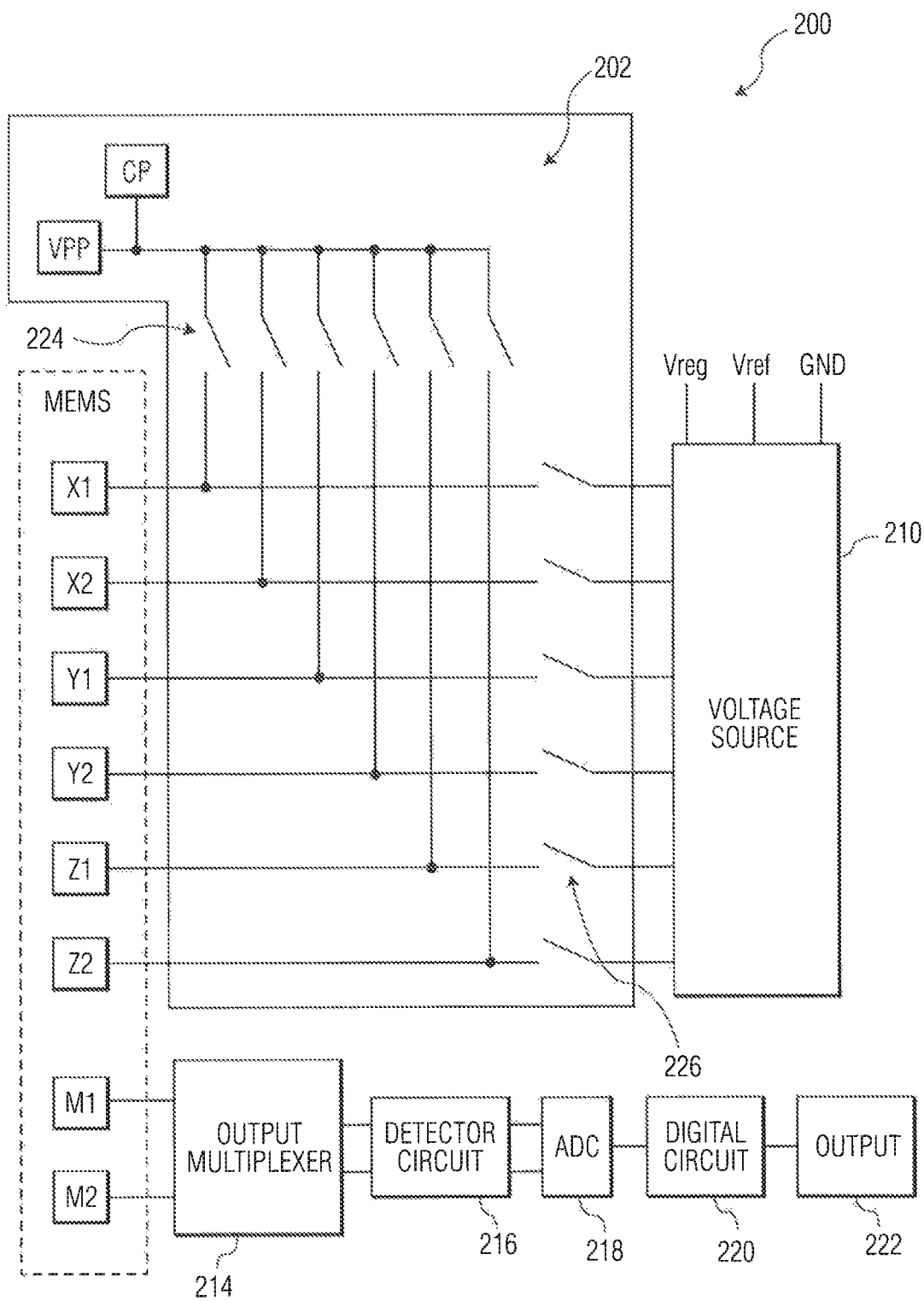
FIG. 13 shows a MEMS sensor device including a high isolation, high voltage multiplexer array in accordance with an embodiment of this disclosure.

FIG. 13 shows a MEMS sensor device 200 in accordance with an embodiment of this disclosure. As described in relation to, for instance, FIG. 12, the device 200 may include MEMS components including a plurality of mobile elements M1, M2 and a plurality of terminals X1, X2, Y1, Y2, Z1, Z2 arranged according to the separate degrees of freedom of the mobile elements (e.g. directions X, Y, Z, which may be substantially orthogonal directions) for applying test voltages during a test mode of the device and for supplying excitation voltages during normal operation of the device 200. As also described herein, excitation voltages may be applied during a test mode of the device to determine the deflection caused by an applied test voltage as part of a C(V) sweep. Also as described previously, the device 200 may include an output multiplexer 214 connected between the mobile elements M1, M2 and a detector circuit 216, for selectively connecting the mobile elements to respective inputs of the detector circuit 216 during normal operation of the device, or to a single input of the detector circuit 216 during a test mode of the device 200.

In this example, the output(s) of the detector circuit 216 (e.g. the positive and negative outputs (Vop and Von) of a differential amplifier DA of the kind shown in FIG. 12) may be connected to the inputs of an analog to digital converter (ADC) 218. A digital circuit 220 may be connected to receive the digitized signals generated by the ADC from the analog output of the detector circuit, to allow the digital signals to be processed in the digital domain. The processed signals may then be outputted by the device at output 222, which may, for instance comprise one of more solder balls 132 of the kind described above in relation to FIG. 11.

The device 200 in FIG. 13 also includes an input multiplexer 202. The input multiplexer 202 may function to supply appropriate signals to the MEMS components of the device 200 (e.g. voltages to be applied across the electrodes of the MEMS components) during a test mode of the device 200. The voltages applied during the test mode can include test voltages for causing a deflection of the mobile elements and also excitation voltages for measuring the deflection caused by the test voltages. In this example, the input multiplexer 202 is also operable to supply appropriate signals to the MEMS components during normal operation of the device 200 (e.g. excitation voltages for the MEMS components), to allow a desired parameter (typically the amount of deflection of the mobile elements caused by acceleration of the device) to be evaluated.

The input multiplexer 202 includes a number of connections for connecting the terminals X1, X2, Y1, Y2, Z1, Z2 to a test voltage source. The test voltage source may be used to apply a plurality of test voltages to the electrodes of the MEMS components for performing the C(V) sweep to be described below. Typically, the voltages supplied by the test voltage source would be higher than the excitation voltages used during normal operation of the device, so as to be able to cause sufficient deflection of the mobile elements to test for stiction. Typically, the test voltages would be of the order of a few volts (e.g. in the range $0 \leq V_{test} \leq 10V$. On the other hand, it is envisaged that the excitation voltages may, for instance, be lower than around 1V.

The voltages required to displace mobile elements of the kind described herein to reach their stops (e.g. see the stops 198 described in relation to FIG. 14 below) generally depends on the MEMS spring restoring force associated with the mobile elements (e.g. see the torsional springs described below in respect of the pivots 301 shown in FIGS. 14 and 15). For very rigid springs (corresponding to a device able to measure very high accelerations), the test voltage may need to be as high as 10V, which may make it difficult to apply through internal circuitry if an ASIC incorporating the device is designed in a low-voltage technology. However, for MEMS sensors using softer, looser springs (corresponding to devices dedicated to measure low level accelerations (up to 16 g for example)), then the voltage required to make the mass contact the stop may typically be lower, e.g. 5V. It is envisaged that test voltages of this kind may be applied through the ASIC.

Although test voltages of the kind described herein may range from 0V to ~5V for low-g accelerometers and the excitations signals may typically be lower than around 1V, it is important to note that the time during which these signals are applied may also generally be different. For instance, it is envisaged that the test voltages may typically be applied for a time long enough to allow the mobile element concerned to reach its steady-state position (typically this may be longer than ~1 ms). On the other hand, it is envisaged that the excitation signals may be applied as short pulses (e.g. of the order of tens of microseconds, e.g. 20 μs), so as not to disturb the displacement of the mobile elements. The excitation signals are used to measure the MEMS capacitances of the mobile elements, but they ideally should not induce any significant displacement of the mobile elements. In summary, it is envisaged that the amplitude and duration of application of the excitation signals may be lower and shorter than that of the test voltage signals.

The test voltage source may, for instance, comprise a charge pump CP located in an ASIC substrate 144 of the device 200. However, in the present example, the test voltage source comprises an external pad or pin (VPP) of the device 200, which may be connected to receive an external voltage, for supplying the test voltages.

The respective connections between each terminal X1, X2, Y1, Y2, Z1, Z2 and the test voltage source VPP/CP each include a switch 224. These switches 224 may be operated selectively to connect and disconnect the terminals X1, X2, Y1, Y2, Z1, Z2 to the test voltage source VPP/CP. During the test mode, the switches 224 may be selectively closed while test voltages are being applied from the test voltage source VPP/CP to the terminals X1, X2, Y1, Y2, Z1, Z2 for deflecting the mobile elements in the X, Y and/or Z directions.

The device 200 in this example also includes a second voltage source 210, for supplying appropriate signals (excitation voltages) to the MEMS components during normal operation of the device 200. The input multiplexer 202 includes a number of connections for connecting the terminals X1, X2, Y1, Y2, Z1, Z2 to the second voltage source 210. The respective connections between each terminal X1, X2, Y1, Y2, Z1, Z2 and the second voltage source 210 each include a switch 226. These switches 226 may be operated selectively to connect and disconnect the terminals X1, X2, Y1, Y2, Z1, Z2 to the second voltage source 210. During normal operation of the device (i.e. outside the test mode), the input multiplexer 202 may be operated selectively to close the switches 226 to allow excitation voltages to be applied to the electrodes of the MEMS components, to allow the detector circuit 216 to evaluate a desired parameter of the MEMS components (such as the amount of deflection of the mobile elements caused by acceleration of the device) in the manner explained previously.

In this embodiment, the input multiplexer 202 is also operable, after the application of a test voltage by the test voltage source VPP/CP during the test mode, to open the switches 224 and close the switches 226 so that the amount of deflection of the mobile elements of the device 200 caused by the application of the test voltage may be evaluated using excitation signals of the kind that are also used during normal operation of the device to determine the deflection of the mobile elements.

In this part of the test mode, while the second voltage source 210 is connected to the electrodes of the mobile elements, the operation of the second voltage source 210 for evaluating the deflection of the mobile elements caused by the application of the test voltages may be conventional, for instance as described above in relation to FIGS. 1 and 2. However, as explained previously in relation to FIG. 12, the output multiplexer may operate to connect one or both of the mobile elements to a single input of the detector circuit 216, so as to produce a non-zero output from the differential amplifier DA.

The operation of the switches 224, 226 and the detector circuit 216 is typically much faster than the decay time of the deflection of the mobile elements, so that the degree of deflection caused by the application of the test voltage may be measured before it reduces due to the disconnection of the electrodes from the test voltage source VPP/CP. The time constant τ for MEMS components comprising mobile elements of the kind described herein is typically between 50 μs and 200 μs. In one example, to avoid losing more than 10% of the initial displacement, the "measurement phase" (during which the test signal ceases to be applied to the electrodes, which are driven by excitation signals) should last less than τ/10, which is between 5 μs and 20 μs. The input multiplexer 202 may operate under the control of a controller 30 of the kind described previously in relation to FIGS. 4-8.

It is envisaged that the components of the device 200, such as the output multiplexer 214, the detector circuit 216, ADC 218, digital part 220, output terminals 222, excitation block 210 and input multiplexer 202 may be located in an ASIC substrate 144 of the device 200 of the kind described above in relation to FIG. 11. For instance, at least some of these components may be included in the sensing circuit 138, for operating the MEMS components, as described in relation to FIG. 11.

Figure 14:
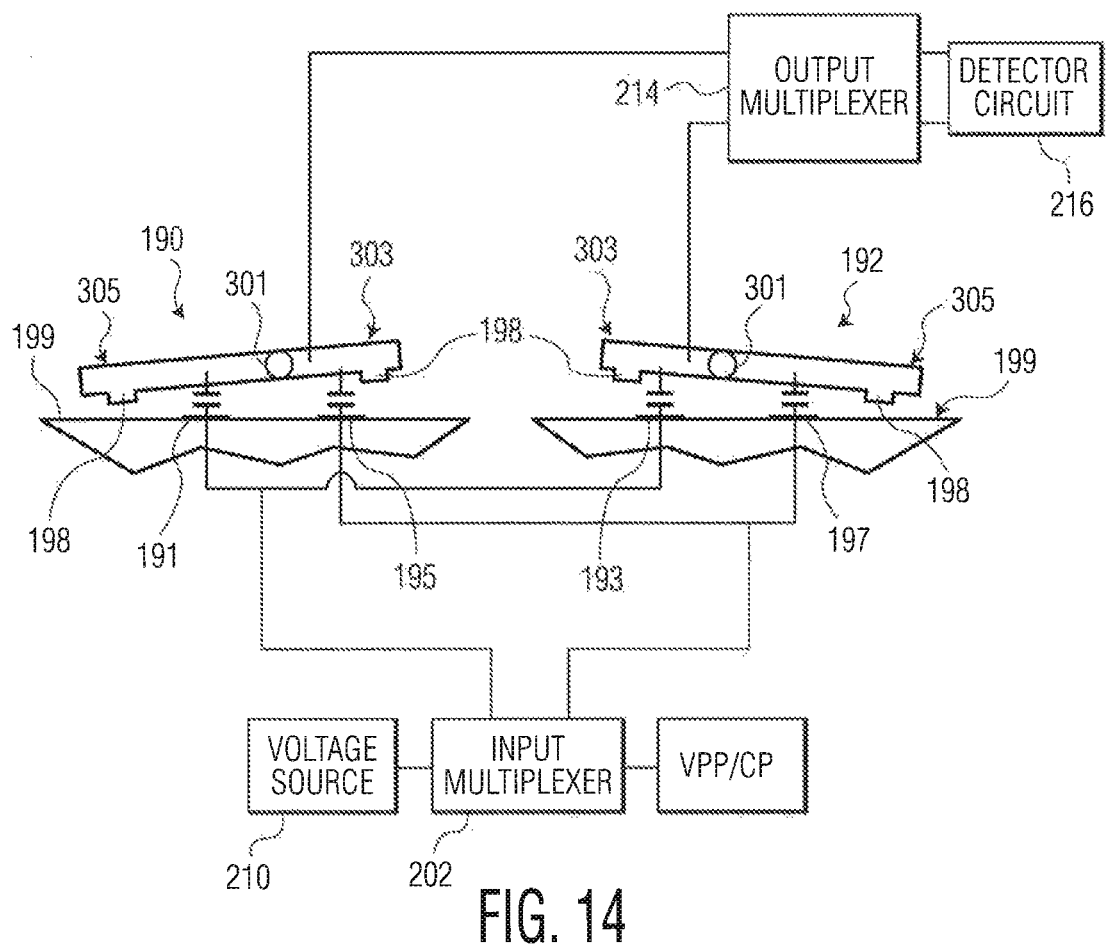
FIG. 14 shows an example of a MEMS sensor device comprising two pivoted arms in accordance with an embodiment of this disclosure.

FIG. 14 shows an example of a MEMS sensor device having mobile elements comprising two lever arms 190, 192 in accordance with another embodiment of this disclosure. The C(V) sweep performed in accordance with a test mode of the kind described herein will be explained in the context of the arrangement of lever arms 190, 192 shown in FIGS. 14 and 15. However, it will be appreciated that the same or similar methodology may be applied to other kinds of mobile element in a MEMS device.

Each lever arm 190, 192 is rotatably mounted on a pivot 301, which may comprise a torsional spring. Each lever arm 190, 192 is mounted on a respective pivot 301.

Each lever arm 190, 192 may have a short end 303 located on a first side of its pivot 301 and a long end 305 located on a second side of its pivot 301 opposite the first side. The asymmetry introduced by the offsetting of the pivot 301 on each lever arm 190, 192 in this way can allow each lever arm 190, 192 to be deflected during normal operation of the device in response to movement (acceleration) of the MEMS sensor device, thereby allowing the device to be used as an accelerometer.

In this example, the long end 305 and the short end 303 of each lever arm 190, 192 both include a stop 198. The stops 198 each face a neighbouring surface of the MEMS sensor device. During operation of the MEMS sensor device, as the lever arms 190, 192 rotate about their pivots 301, the stops 198 may come into contact with the neighbouring surface 199 of the device, preventing further rotation of the lever arms 190, 192.

As shown in FIG. 14, the device may be provided with terminals Z1, Z2 of the kind described above. The device may also include electrodes 191, 193 connected to the terminal Z1 and electrodes 195, 197 connected to the terminal Z2. As shown in FIG. 14, in this example:

the electrode 191 is located adjacent the long end 305 of a first of the lever arms 190 (e.g. on the surface 199 beneath the lever arm 190);

the electrode 193 is located adjacent the short end 303 of the second lever arm 192 (e.g. on the surface 199 beneath the lever arm 192);

the electrode 195 is located adjacent the short end 303 of the first lever arm 190 (e.g. on the surface 199 beneath the lever arm 190); and the electrode 197 is located adjacent the long end 305 of a second of the lever arms 192 (e.g. on the surface 199 beneath the lever arm 192).

This arrangement is analogous to the arrangement of the terminals Y1, Y2 and electrodes S11, S12, S21, S22 described above in relation to FIG. 12.

The device in FIG. 14 includes also an output multiplexer 214 and a detector circuit 216 and of the kind described above in relation to FIGS. 12 and 13. Each lever arm 190, 192 is connected to an input of the output multiplexer 214. The outputs of the output multiplexer 214 are each connected to a respective one of the two inputs of the detector circuit 216 as explained previously. The device further includes an input multiplexer 202 connected to the terminals Z1, Z2, a test voltage source (VPP/CP) and a second voltage source 210 of the kind described above in relation to FIG. 13. The operation of the device shown in FIG. 14 during normal operation and in a test mode is also analogous to that described above in relation to FIGS. 12 and 13.

Figure 15:
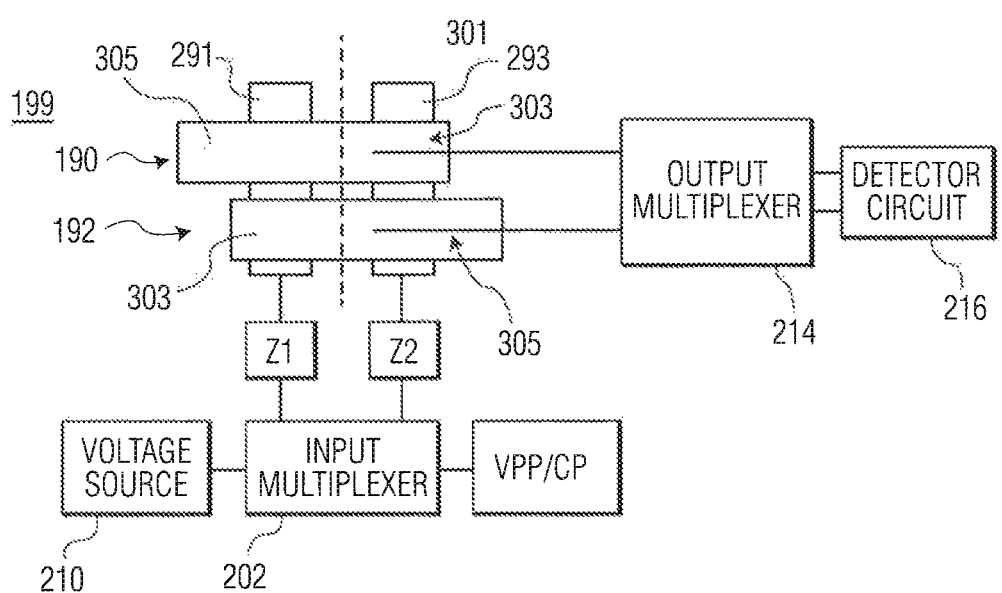
FIG. 15 shows an example of a MEMS sensor device comprising two pivoted arms in accordance with an embodiment of this disclosure.

FIG. 15 shows another example of a MEMS sensor device having mobile elements comprising two lever arms 190, 192 in accordance with another embodiment of this disclosure. While FIG. 14 shows a side view of the lever arms 190, 192 in that embodiment, the view in FIG. 15 is from above the lever arms 190, 192, looking down onto the surface 199. The C(V) sweep performed in accordance with a test mode of the kind described herein will be explained in the context of the arrangement of lever arms 190, 192 shown in FIGS. 14 and 15. Again, it will be appreciated that the same or similar methodology may be applied to other kinds of mobile element in a MEMS device.

In the present embodiment, each lever arm 190, 192 is rotatably mounted on a respective pivot, which may comprise a torsional spring. The pivots are arranged in this example to have a common axis, which is shown in FIG. 15 using the dotted line 301. As in FIG. 14, each lever arm 190, 192 has a short end 303 located on a first side of the pivot 301 and a long end 305 located on a second side of the pivot 301 opposite the first side. Again, the asymmetry introduced by the offsetting of the pivot 301 with respect to each lever arm 190, 192 allows each lever arm 190, 192 to be deflected during normal operation of the device in response to movement (acceleration) of the MEMS sensor device, thereby allowing the device to be used as an accelerometer.

In this example, the long end 305 and the short end 303 of each lever arm 190, 192 can both include a stop of the kind described in relation to FIG. 14. The stops may be located on an underside of each lever arm 190, 192, facing the surface 199 and accordingly are not visible in FIG. 15.

As shown in FIG. 15, the device may be provided with terminals Z1, Z2. The device also includes an electrode 291 connected to the terminal Z1 and an electrode 293 connected to the terminal Z2. As shown in FIG. 15, in this example:

the electrode 291 is located adjacent (e.g. on the surface 199 beneath the lever arms 190, 192) both the long end 305 of a first of the lever arms 190 and the short end 303 of the first lever arm 190; and the electrode 293 is located adjacent (e.g. on the surface 199 beneath the lever arms 190, 192) both the long end 305 of a second of the lever arms 192 and the short end 303 of the second lever arm 192.

This arrangement of the electrodes 291, 293 allows the device to operate in much the same way as the device of FIG. 14, while allowing the overall number of separate electrodes located in the device to be reduced, which is desirable from the point of view of manufacturing cost and reliability.

The device in FIG. 15 includes also an output multiplexer 214 and a detector circuit 216 and of the kind noted above in relation to FIGS. 12 and 13. Each lever arm 190, 192 is connected to an input of the output multiplexer 214. The outputs of the output multiplexer 214 are each connected to a respective one of the two inputs of the detector circuit 216 as explained previously. The device further includes an input multiplexer 202 connected to the terminals Z1, Z2, a test voltage source (VPP/CP) and a second voltage source 210 of the kind described above in relation to FIG. 13. The operation of the device shown in FIG. 14 during normal operation and in a test mode is also analogous to that described above in relation to FIGS. 12 and 13.

During a test mode of the devices shown in FIGS. 14 and 15, test voltages VPP (or CP) may be applied using the electrodes 191, 193, 195, 197 or the electrodes 291, 293, to cause deflection of the lever arms 190, 192 to perform a C(V) to test for stiction of the device. The application of these test voltages may be interleaved with the application of excitation voltages for determining the amount of deflection of the lever arms 190, 192 that is caused by the test voltages, as illustrated schematically in FIG. 16.

Figure 16:
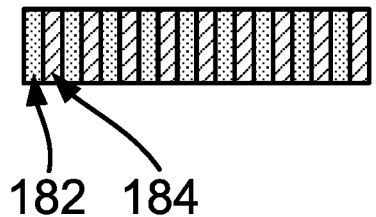
FIG. 16 shows an example of a series of interleaved excitation and measurement phases during a test mode of a MEMS sensor device in accordance with an embodiment of this disclosure.

FIG. 16 shows that the test voltages may be applied during time periods 182, and that these time periods 182 may be interleaved with time periods 184, during which the excitation voltages may be applied.

In the present embodiment, during time periods 182, the input multiplexer 202 of the device (such as the one described above in relation to FIG. 13) may operate to connect the terminal Z1 or Z2 (and thus the electrodes 191, 193 or 195, 197, or electrode 291 or electrode 293) to the test voltage source VPP/CP of the device, and the output multiplexer 214 of the device (such as that described in relation to FIG. 12), may operate to connect one or both mobile elements (lever arms 190, 192 in the examples of FIGS. 14 and 15) of the device to a single input of a detector circuit 216 (also of the kind shown in FIG. 12). Note that the test voltages would not typically be applied to both terminals Z1 and Z2 simultaneously, since this would generally lead to zero net displacement of the lever arms 190, 192 (e.g. the electrostatic force between the electrode 191 and the lever arm 190 would effectively cancel out the electrostatic force between the electrode 195 and the lever arm 190, whereby the lever arm 190 would not rotate). Instead, the test voltages may be applied to one of the terminals Z1, Z2 at a time (e.g. for testing for stiction associated either with the stops 198 on the long end 305 or on the short end 303 of the lever arms 190, 192). While the test voltages are applied, the other terminal Z1, Z2 (i.e. the terminal to which the test voltages are not being applied) may be connected to a voltage substantially equal to the voltage on the lever arm 190, 192 (i.e. Vref, as explained previously), so that there is zero (e.g. attractive) electrostatic force present between the electrodes connected to that terminal and the lever arm 190, 192.

During the time periods 184, the input multiplexer 202 may operate to connect the terminals Z1, Z2 (and thus the electrodes 191, 193, 195, 197 or the electrodes 291, 293) to the second voltage source 210 of the device, for supplying appropriate signals to evaluate the deflection of the lever arms 190, 192 caused by the test voltages as explained previously. Again, since the multiplexer 202 may switch quickly between connection of the terminals Z1, Z2 to the test voltage source VPP/CP and to the second voltage source 210, the detector circuit 216 may evaluate the deflection of the lever arms 190, 192 before the deflection of the lever arms 190, 192 caused by the application of the test voltages has time to decay (reduce). Accordingly, accurate measurements of the deflection of the lever arms 190, 192 (which may in some examples be expressed as an angle of rotation of the lever arms 190, 192 about the pivot(s) 301) may be made.

Figure 17A:
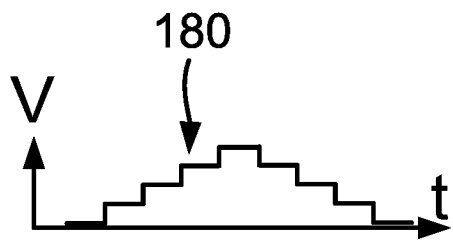
FIGS. 17A and 17B each show examples of the application of a series on excitation voltages during a test mode of a MEMS sensor device in accordance with an embodiment of this disclosure.
Figure 17B:
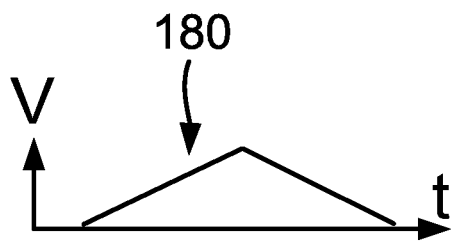

Unlike the embodiments described above in relation to FIGS. 4 to 8, the test voltages which may be applied in the present examples (FIGS. 12-19) are suitable for performing a C(V) sweep for test for stiction. The test voltages may be applied by applying the appropriate potentials to the terminals Z1, Z2. The test voltages may be applied with a profile 180 of the kind shown in FIG. 17A or 17B. As can be seen in FIG. 17A or 17B, the test voltages may be applied by monotonically increasing the voltage applied across each electrode and the mobile elements (for performing an upwards part of the C(V) sweep) and thereafter by monotonically decreasing the voltage applied across each electrode and the mobile elements (for performing a downwards part of the C(V) sweep).

The upwards and/or downwards parts of the sweep may involve applying test voltages in a set of discrete steps as shown in FIG. 17A or alternatively by applying a continuously increasing/decreasing voltage over time as shown in FIG. 17B. In the case of FIG. 17A, each step may correspond in time to one of the time periods 182 shown in FIG. 16. In the case of FIG. 17B, each of a plurality of segments of the linearly increasing voltage may correspond in time to one of the time periods 182 shown in FIG. 16.

Figure 18:
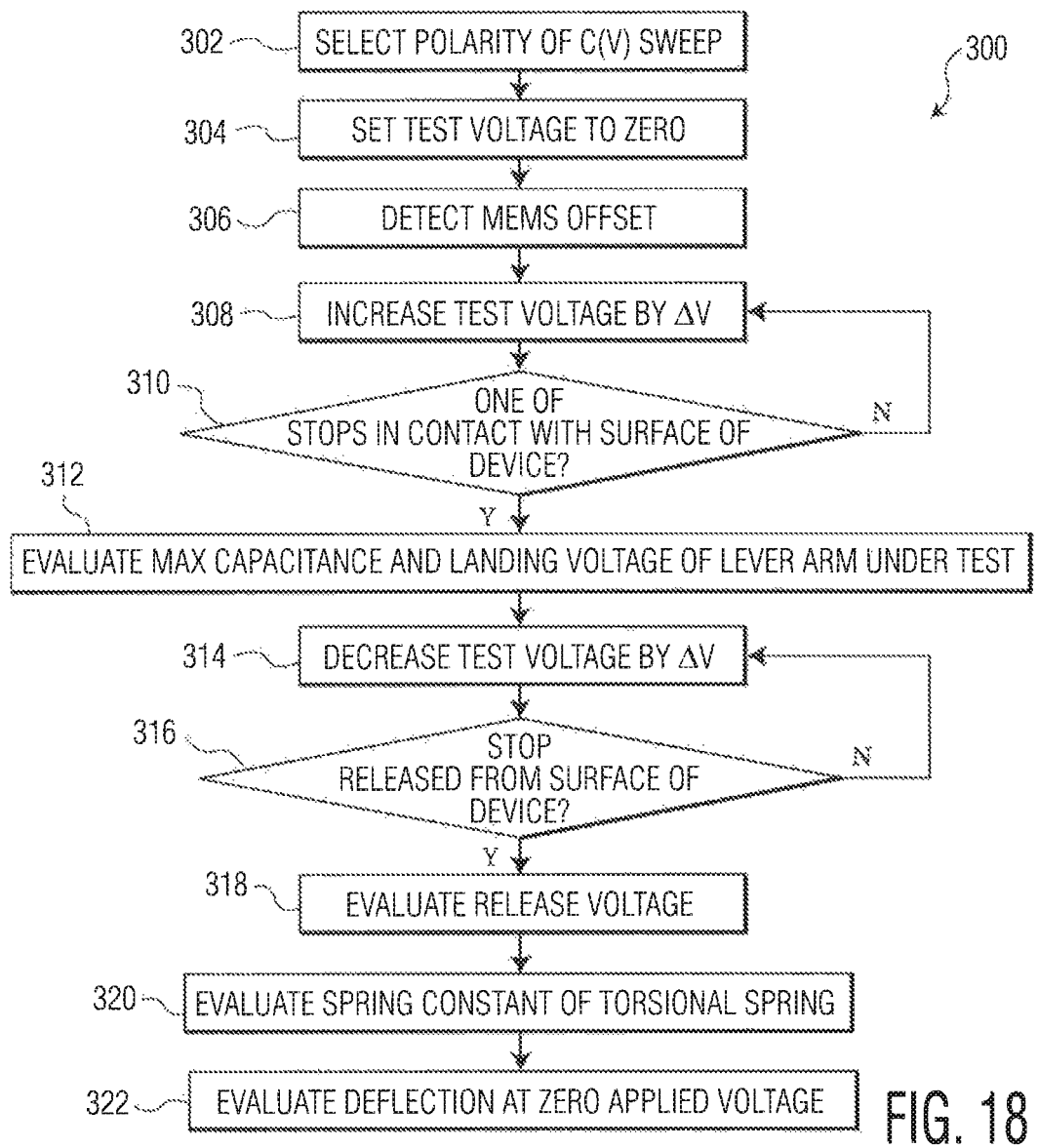
FIGS. 18 and 19 illustrate a method for testing a MEMS sensor device in accordance with an embodiment of this disclosure.
Figure 19:
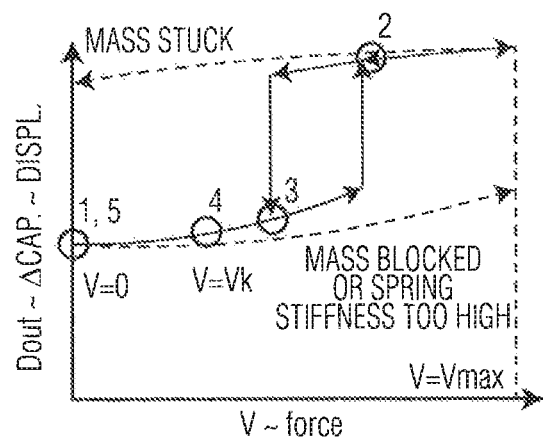

FIGS. 18 and 19 illustrate a method for testing a MEMS sensor device of the kind (i.e. having lever arms 190, 192) described in relation to FIG. 14 or 15, in accordance with an embodiment of this disclosure. The test includes a C(V) sweep to check for stiction of the lever arms 190, 192 when the stops 198 come into contact with the surface 199. It will be appreciated that the same or similar methodology may be applied to other kinds of MEMS device (e.g. the device of FIG. 12).

In FIG. 19, the vertical axis represents the output voltage (Vout) of the detector circuit 216 of the device while the C(V) sweep is performed. As explained previously, the detector circuit 216 may be configured as shown in FIG. 12 to include two inputs, a differential amplifier DA, feedback capacitors (Cf1, Cf2), and two outputs (Vop, Von). The lever arms 190, 192 of the device are connected to the detector circuit 216 via an output multiplexer 214 in the manner also described previously in relation to FIG. 12. The output voltage Vout is proportional to the difference in the capacitances between the lever arms 190, 192 and the electrodes connected to the terminals Z1, Z2. This difference in capacitance is, in turn, generally proportional to the amount of deflection of the lever arms 190 about the pivot(s) 301.

The horizontal axis in FIG. 19 represents the difference between the test voltage applied to the terminal Z1 and the voltage on the lever arms 190, 192 when testing in one direction of rotation of the lever arms 190, 192. For instance, to test for stiction of the stop 198 on the long end 305 of the lever arm 190 and/or the stop 198 on the short end 303 of the lever arm 192, the test voltages may be applied to the electrodes 191, 193 (via the terminal Z1) and may be chosen to cause an electrostatic attraction between the ends 305, 303 and the electrodes 191, 193, respectively. While the test voltages are applied to the terminal Z1, the other terminal Z2 may be connected to a voltage substantially equal to the voltage on the lever arm 190, 192 (i.e. Vref, as explained previously), so that there is zero (e.g. attractive) electrostatic force present between the electrodes connected to terminal Z2 and the lever arm 190, 192. Accordingly, the horizontal axis in FIG. 19 may represent the difference between the test voltage applied to terminal Z1 and Vref. It will be appreciated that for testing for stiction of the stop 198 on the short end 303 of the lever arm 190 and/or the stop 198 on the long end 305 of the lever arm 192, the test voltages may be applied to the electrodes 195, 197 (via the terminal Z2) and may be chosen to cause an electrostatic attraction between the ends 303, 305 and the electrodes 195, 197, respectively. It will also be appreciated that while the test voltages are being applied using terminal Z2, terminal Z1 may be connected to a voltage substantially equal to the voltage on the lever arm 190, 192 (i.e. Vref, as explained previously), so that there is zero (e.g. attractive) electrostatic force present between the electrodes connected to terminal Z1 and the lever arm 190, 192.

It is envisaged that when testing for stiction, it may be preferred to test each mobile element separately by configuring the output multiplexer 214 appropriately (e.g. to connect just one of the lever arms 190, 192 to a single input of the detector circuit 216 as explained previously). Otherwise, the response of the detector circuit 216 would be a combination of the responses of the both mobile elements, which may be difficult to interpret.

As explained previously, during the C(V) sweep, the test voltage may initially be increased monotonically, and then decreased monotonically, either continuously or in a series of discrete steps.

An example of the various stages of a C(V) sweep 300 will now be described in relation to FIG. 18, with reference also to FIG. 19.

Typically, the C(V) sweep may be carried out on one lever arm 190, 192 at a time. For instance, the output multiplexer 214 of the device may connect only one of the lever arms 190, 192 to a single one of the inputs of the detector circuit 216 while the excitation voltages are being applied to measure the deflection of the lever arm 190, 192 under test.

In step 302, a polarity of the C(V) sweep is first selected. As explained previously, the mobile elements of a device of the kind described herein may be provided with multiple sets of electrodes for determining deflection of a mobile element along a set of different directions (e.g. X, Y, Z . . . ). In the present example, the degree of freedom associated with the electrodes Z1, Z2 is chosen for the C(V) sweep (using the arrangements shown in either FIG. 14 or FIG. 15). It is envisaged the method shown in FIG. 17 may be repeated for other degrees of freedom of the mobile element (lever arm 190, 192) using other electrodes which are positioned accordingly.

In a next step 304, the test voltage is set to zero. In a next step 306, the MEMS offset (the amount of deflection at zero applied voltage) of the lever arm 190, 192 under test is detected by the detector circuit 216. This corresponds to location "1" on the hysteresis curve shown in FIG. 19.

In a next step 308, the test voltage is increased by an increment ΔV, and the amount of deflection of the lever arm 190, 192 under test is determined by the detector circuit 216 by applying excitation signals as explained previously. In step 310, the output of the detector circuit 216 is evaluated to determine whether it has been detected that one of the stops 198 has come into contact with the surface 199. This generally occurs when the torsional spring force of the pivot 301, to which the lever arm 190, 192 under test is attached, is overwhelmed by the electrostatic force applied on the lever arm 190, 192 under test by the test voltage. As can be seen in FIG. 19, this can be determined by the observance of a discontinuous jump (increase) in the measured displacement of the lever arm 190, 192 under test.

If, in step 310, it is not detected that one of the stops 198 has come into contact with the surface 199, then the method loops back to step 308, whereby the test voltage is again increased by an increment ΔV. This continues until eventually in step 310, it is detected that one of the stops 198 has come into contact with the surface 199.

As shown in FIG. 19, after it has been detected that one of the stops 198 has come into contact with the surface 199, the test voltage may increase further, to take further measurements. Note that no significant change in the output is observed at these voltages, because the lever arm 190, 192 under test cannot move any further due to the stop 198 being in contact with the surface 199. At some point, the application of the set of monotonically increasing test voltages is completed. Thereafter, as described herein, a set of test voltages comprising monotonically decreasing voltages may be applied.

At step 312, using the measurements acquired thus far (in particular the measurements taken at and/or near location "2" on the hysteresis curve shown in FIG. 19, which corresponds to the location of the aforementioned jump in displacement of the lever arm 190, 192 under test), the maximum capacitance and landing voltage of the lever arm 190, 192 under test is evaluated. The maximum capacitance and landing voltage constitute two figures of merit for the lever arm 190, 192 under test, and may be used to characterise the quality of the device. For instance, if the landing voltage is higher than expected, this may indicate that the torsional spring force on the pivot 301 is too high. In another example, if the maximum capacitance is smaller than expected, this may indicate that the gap between the lever arm 190, 192 under test and the surface 199 is too large, or that the stop 198 beneath the lever arm 190, 192 under test is too thick. It will be appreciated that if no discontinuous increase in the displacement of the lever arm 190, 192 under test were to be detected, this would be indicative of the torsional spring force on the pivot 301 being much too strong and/or that the lever arm 190, 192 is blocked in some way, whereby it cannot reach the surface 199 (this is indicated by the dashed arrow labelled "Mass blocked or spring stiffness too high" in FIG. 19).

In a next step 314, the test voltage is decreased by an increment ΔV, and the amount of deflection of the lever arm 190, 192 under test is determined by the detector circuit 216 by applying excitation signals as explained previously. In step 316, the output of the detector circuit 216 is evaluated to determine whether it has been detected that the stop 198 has released from the surface 199. This generally occurs when the torsional spring force of the pivot 301, to which the lever arm 190, 192 under test is attached, becomes greater than the forces keeping the lever arm 190, 192 under test in contact with the surface 199. The forces keeping the lever arm 190, 192 under test in contact with the surface 199 may generally include the force associated with the test voltage, but may also include a stiction force, associated with the stop 198 sticking to the surface 199. Note that the discontinuous decrease in displacement associated with release of the lever arm 190, 192 under test from the surface 199 occurs in a different location in FIG. 19 to the discontinuous increase corresponding to the landing of the lever arm 190, 192 under test on the surface 199. This difference can be used to evaluate stiction of the lever arm 190, 192 under test to the surface 199.

If, in step 316, it is not detected that the stop 198 has released from surface 199, then the method loops back to step 314, whereby the test voltage is again decreased by an increment ΔV. This continues until eventually in step 316, it is detected that the stop 198 has released from surface 199.

Next, in step 318, the release voltage is evaluated (using the measurements made at, or the vicinity of location "3" on the hysteresis curve shown in FIG. 19. The release voltage may be used to evaluate stiction in the device as noted previously. It will be appreciated that if no discontinuous decrease in the displacement of the lever arm 190, 192 under test were to be detected, this would be indicative of the lever arm 190, 192 under test being completely stuck to the surface 199 (this is indicated by the dashed arrow labelled "mass stuck" in FIG. 19).

After the release of the lever arm 190, 192 under test from the surface 199 has been detected, the set of decreasing applied test voltages may continue to be applied.

In step 320, with the test voltage set at a value intermediate a zero applied voltage and the landing voltage of the lever arm 190, 192 under test, the spring constant of the torsional spring of the pivot 301 of the lever arm 190, 192 under test may be evaluated.

Finally, in step 322, the amount of deflection at zero applied voltage may be evaluated at location "5" on the hysteresis curve. This measurement may be compared with the measurement of the MEMS offset made in step 306 above, to check for hysteresis.

On completion of the C(V) sweep using terminal Z1 (or Z2), a similar sweep may be performed by applying the test voltages to the other of the two terminals Z1, Z2, to test for stiction of the stop 198 on the opposite end of the lever arm 190, 192. Moreover, on completion of the C(V) sweep(s) in the Z direction, similar sweep(s) may be made along different axes of the device (e.g. X-axis, Y-axis).

Although the example method described above is performed for each axis separately in the sense that the stiction detection is performed in one direction at a time (e.g. along the z-direction first, then along the x-direction, then along the y-direction), it is envisaged that the C(V) sweeps may be performed in different directions simultaneously.

For instance, in the example described above, a C(V) sweep may be performed for the X axis in an X axis test mode, but to perform a C(V) sweep for the Y axis, the device may need to exit the X axis test mode and enter a Y axis test mode. However, it is envisaged that in an MEMS sensor such as a 3-axis accelerometer, it would be possible to perform C(V) sweeps on the three axes simultaneously, as a dedicated pair of excitation electrodes may be provided for each axis and the device may measure the MEMS capacitances associated with the three axes sequentially during the "measurement phase". For example, during the actuation phase (i.e. while the test voltages are being applied), electrodes X1, Y1 and Z1 could be connected to the test voltage while X2, Y2 and Z2 remain biased to Vref During the subsequent measurement phase (i.e. while the excitation voltages are being applied), displacements of the mobile elements along the 3 directions would be measured sequentially in the manner described above. Therefore, three C(V) curves corresponding to the three axes could be obtained simultaneously.

Notwithstanding the above, it is envisaged that it may still be necessary to repeat the methodology set out in FIG. 18 to obtain the C(V) sweep when the mass moves in the opposite direction (i.e. for testing for stiction of the stops located on an opposite end of the lever arms). As explained previously, reversing the direction of displacement for the mobile elements may be implemented by connecting the terminals X2, Y2 and Z2 to the test voltages while in the actuation phase, while the terminals X1, Y1 and Z1 remain biased to a voltage such as Vref.

Accordingly, there has been described a micro-electro-mechanical system (MEMS) device and a method of testing a MEMS device. The device includes a MEMS sensor having first and second mobile elements, first and second electrodes arranged to deflect the mobile elements by the application of test voltages, and a differential detector circuit. The device also includes an input multiplexer circuit configured selectively to connect each electrode to a test voltage source to apply a plurality of test voltages to deflect the mobile elements during a test mode. The test voltages comprise a set of monotonically increasing test voltages and a set of monotonically decreasing voltages for performing a C(V) sweep to test for stiction. The device further includes an output multiplexer circuit configured selectively to connect the first mobile element and/or the second mobile element to a single one of the inputs of the detector circuit to detect the deflection of the mobile element.

Although particular embodiments of this disclosure have been described, it will be appreciated that many modifications/additions and/or substitutions may be made within the scope of the claims.

The invention claimed is:

1. A micro-electro-mechanical system (MEMS) device comprising:
 a MEMS sensor comprising:
  a first mobile element;
  a second mobile element;
  a first electrode arranged to deflect the first mobile element and the second mobile element by application of a voltage across said first electrode and the first and second mobile elements;
  a second electrode arranged to deflect the first mobile element and the second mobile element by application of a voltage across said second electrode and the first and second mobile elements;
 a differential detector circuit comprising a first input and a second input;
 an input multiplexer circuit comprising one or more switches configured selectively to connect each electrode to a test voltage source to apply a plurality of test voltages across each electrode and said mobile elements to deflect the mobile elements during a test mode of the device, wherein said test voltages comprise a first set of monotonically increasing test voltages and a second set of monotonically decreasing test voltages for performing a C(V) sweep to test for stiction of the mobile elements; and
 an output multiplexer circuit comprising one or more switches configured selectively to connect the first mobile element and/or the second mobile element to a single one of said first and second inputs of the detector circuit during said test mode to detect the deflection of the first mobile element and/or the second mobile element caused by the application of said test voltages.

2. The device of claim 1, wherein the input multiplexer circuit is further configured to disconnect each electrode from the test voltage source and to connect each electrode to a second voltage source during said test mode, for performing a C(V) measurement at each of said plurality of test voltages, wherein the C(V) measurements are interleaved with the application of said test voltages.

3. The device of claim 2, wherein the input multiplexer circuit is further configured to disconnect each electrode from the test voltage source and to connect each electrode to said second voltage source during a normal operation of the device.

4. The device of claim 1 further comprising a controller configured to:
 open one or more first switches of the input multiplexer circuit for disconnecting each electrode from the test voltage source; and
 close one or more second switches of the input multiplexer circuit for connecting each electrode to a second voltage source for applying excitation signals for measuring the deflection of the first mobile element and/or the second mobile element caused by the application of said test voltages.

5. The device of claim 1, wherein the input multiplexer circuit is configured to:
 apply the first set of monotonically increasing test voltages by continuously increasing the test voltages during said test mode; and apply the second set of monotonically decreasing test voltages by continuously decreasing the test voltages during said test mode.

6. The device of claim 1, wherein the input multiplexer circuit is configured to:
apply the first set of monotonically increasing test voltages by increasing the test voltages in a series of discontinuous steps; and
apply the second set of monotonically decreasing test voltages by decreasing the test voltages in a series of discontinuous steps.

7. The device of claim 1, wherein the output multiplexer circuit further comprises:
one or more balancing capacitors; and
one or more switches configured selectively to connect either the first or the second input of the detector circuit to said one or more balancing capacitors during said test mode.

8. The device of claim 1, wherein said detector circuit comprises a differential amplifier.

9. The device of claim 1, wherein each mobile element comprises a lever arm mounted on a pivot, the lever arm having a short end located on a first side of the pivot and a long end located on a second side of the pivot opposite the first side.

10. A method of testing a micro-electro-mechanical system (MEMS) device, the device comprising:
a MEMS sensor comprising:
a first mobile element;
a second mobile element;
a first electrode arranged to deflect the first mobile element and the second mobile element by application of a voltage across said first electrode and the first and second mobile elements;
a second electrode arranged to deflect the first mobile element and the second mobile element by application of a voltage across said second electrode and the first and second mobile elements;
a differential detector circuit comprising a first input and a second input;
an input multiplexer circuit; and
an output multiplexer circuit,
the method comprising performing a C(V) sweep to test for stiction of the mobile elements by:
operating one or more switches of the input multiplexer circuit during a test mode of the device selectively to connect each electrode to a test voltage source to apply a plurality of test voltages across each electrode and said mobile elements, wherein said test voltages comprise a first set of monotonically increasing test voltages and a second set of monotonically decreasing test voltages; and
operating one or more switches of the output multiplexer circuit selectively to connect the first mobile element and/or the second mobile element to a single one of said first and second inputs of the detector circuit during said test mode to detect the deflection of the first mobile element and/or the second mobile element caused by the application of said test voltages.

11. The method of claim 10, further comprising:
performing a C(V) measurement at each of said plurality of test voltages by operating the input multiplexer circuit to disconnect each electrode from the test voltage source and to connect each electrode to a second voltage source during said test mode,
wherein the C(V) measurements are interleaved with the application of said test voltages.

12. The method of claim 11, further comprising:
operating the input multiplexer circuit to disconnect each electrode from the test voltage source and to connect each electrode to said second voltage source during a normal operation of the device.

13. The method of claim 10, further comprising:
opening one or more first switches of the input multiplexer for disconnecting each electrode from the test voltage source; and
closing one or more second switches of the input multiplexer for connecting each electrode to the second voltage source for applying excitation signals for measuring the deflection of the mobile element caused by the application of said test voltage.

14. The method of claim 10, further comprising operating the input multiplexer circuit to:
apply the first set of monotonically increasing test voltages by continuously increasing the test voltage during said test mode; and
apply the second set of monotonically decreasing test voltages by continuously decreasing the test voltage during said test mode.

15. The method of claim 10, further comprising operating the output multiplexer circuit to connect either the first or the second input of the detector circuit to one or more balancing capacitors during said test mode.

* * * * *